(12) United States Patent
Qiu et al.

(10) Patent No.: US 8,542,636 B2
(45) Date of Patent: Sep. 24, 2013

(54) VEHICULAR CONTENT DISTRIBUTION

(76) Inventors: Lili Qiu, Austin, TX (US); Yin Zhang, Austin, TX (US)

( * ) Notice: Subject to any disclaimer, the term of this patent is extended or adjusted under 35 U.S.C. 154(b) by 314 days.

(21) Appl. No.: 12/983,884

(22) Filed: Jan. 3, 2011

(65) Prior Publication Data

US 2011/0164562 A1    Jul. 7, 2011

Related U.S. Application Data

(60) Provisional application No. 61/291,984, filed on Jan. 4, 2010.

(51) Int. Cl.
*H04W 4/00*        (2009.01)

(52) U.S. Cl.
USPC ............................................................ 370/328

(58) Field of Classification Search
USPC ......... 370/203, 204–215, 229–240, 310–337, 370/338–350, 351–394, 395.1, 395.3, 395.4, 370/395.41, 395.42, 395.5, 395.52, 395.53, 370/412–421, 431–457, 458–463, 464–497, 370/498–522, 523–520, 521–529
See application file for complete search history.

(56) References Cited

U.S. PATENT DOCUMENTS

| | | | |
|---|---|---|---|
| 8,339,990 B1 * | 12/2012 | Tzamaloukas ................. | 370/254 |
| 8,399,990 B2 * | 3/2013 | Lin et al. ........................ | 257/758 |
| 2010/0030840 A1 * | 2/2010 | O'Shea et al. ................. | 709/201 |
| 2012/0182860 A1 * | 7/2012 | Liu et al. ........................ | 370/216 |

OTHER PUBLICATIONS

Padmanabhan, Venkata N., et al., "Using Predictive Prefetching to Improve World Wide Web Latency," SIGCOMM Computer Communication Review, (1996), 26(3):22-36.

Pathirana, Pubudu N., et al., "Mobility Modelling and Trajectory Prediction for Cellular Networks with Mobile Base Stations," MobiHoc, Jun. 1-3, 2003, Annapolis, Maryland, pp. 213-221.
Ramani, Ishwar, et al., "SyncScan: Practical Fast handoff for 802.11 Infrastructure Networks," IEEE, (2005), pp. 675-684.
Radunovic, Bozidar, et al., "Rate Performance Objectives of Multi-Hop Wireless Networks," IEEE, (2004), 12 pages.
Seattle Bus Traces, http://crawdad.cs.dartmouth.edu/meta.php?name=rice/ad$_{13}$ hoc_city, (2012), 12 pages.
Shin, Minho, et al., "Improving the Latency of 802.11 Hand-Offs Using Neighbor Graphs," Proc. of Mobisys, Jun. 2004, 13 pages.
Smartphone, http://en.wikipedia.org/wiki/Smartphone, (2012), 15 pages.

(Continued)

*Primary Examiner* — Jung-Jen Llu
(74) *Attorney, Agent, or Firm* — Daniel J. Chalker; Chalker Flores, LLP

(57) ABSTRACT

A system and method provides an electronic content to a vehicle from access point(s) within a network using a controller. The controller divides the electronic content into one or more files wherein each file contains at least one packet, and generates two or more random linear combinations of the packets within each file. For each file, each random linear combination of the packets is replicated to a different access point within the network. The electronic content is provided to the vehicle using at least one of the different access points. The controller can also determine a set of nearest trajectories for the vehicle in a location database that match a recent location history for the vehicle. For each determined nearest trajectory, one or more mobility trajectories are determined for the vehicle, and a set of access points are determined that correspond to the determined mobility trajectories for the vehicle.

26 Claims, 32 Drawing Sheets

(56) References Cited

OTHER PUBLICATIONS

Song, Libo, et al., Predictability of WLAN Mobility and its Effects on Bandwidth Provisioning, Proc. of Mobisys., Jun. 2004, 13 pages.
Song, Libo, et al., "Evaluating Location Predictors with Extensive Wi-Fi Mobility Data," IEEE, 2004, 11 pages.
Teleclick, "Laptop & Smartphone Users Prefer Wi-Fi to 3G; Willing to Pay for Citywide Wi-Fi," http://www.teleclick.ca/2009/02/laptop-willing-to-pay-for-citywide-wi-fi/, 2 pages.
Toyota and Honda Start Testing Vechile-to-Vehicle Communications System, http://www.motorauthority.com/news/1030812_toyota-and-honda-start-testing-vehicle-to-vehicle-communications-systems, Mar. 7, 2012, 4 pages.
Vahdat, Amin, et al., "Epidemic Routing for Partially-Connected Ad Hoc Networks," Technical Report CS-200006, Duke University, (2000), 19 pages.
Vehicular Ad-Hoc Network, http://en.wikipedia.org/eiki/vehicular_ad_hoc_network, Mar. 7, 2012, 3 pages.
Who Are We?, http://www.wifi-taxi-com/index/php/enwho-are-wr.html, Mar. 7, 2012, 2 pages.
Worldwide Pricelist for iPhone 3G Plans (22 countries), http://forums.crackberry.com/showthread.pho?t=52714, Mar. 7, 2012, 5 pages.
Akyildiz, Ian F., et al., "The Predictive User Mobility Profile Framework for Wireless Multimedia Networks," IEEE/ACM Trans. Netw., (2004), 12(6):1021-1035.
Al-Qahtani, "Grazing and its Influence on Vegetation and Soil in the Highlands of the Asir Region, Saudi Arabia," Journal of the Gulf and Arabian Peninsula Studies, (2001), vol. XXV!!, No. 102, pp. 15-33.
AT&T High Speed Internet, http://www.att.com/dsl/#fbid=UPxO3BCcRJP, 1 page.
Balasubramanian, Aruna, et al., "DTN Routing as a Resource Allocation Problem," SIGCOMM, Aug. 27-31, 2007, Kyoto, Japan, 12 pages.
Balasubramanian, Aruna, et al., "Enhancing Interactive Web Applications in Hybrid Networks," MobiCom, Sep. 14-19, 2008, San Francisco, California, 11 pages.
Balasubramanian, Aruna, et al., "Interactive WiFi Connectivity for Moving Vehicles," Proc. of SIGCOMM, (2008), 13 pages.
Banerjee, Nilanjan, et al., "Relays, Base Stations, and Meshes: Enhancing Mobile Networks with Infrastructure," MobilCom, Sep. 14-19, 2008, San Francisco, California, 11 pages.
BMW, "Car2car Communication Development," http://www.motorauthority.com/bmw-enlists-in-car-2-car-communications-development.html, Oct. 26, 2008, 4 pages.
Breslau, Lee, et al., "Web Caching and Zipf-Like Distributions: Evidence and Implications," IEEE Inforom, (1999), vol. XX, No. Y,. 9 pages.
Brik, Vladimir, et al., "Eliminating Handoff Latencies in 802.11 WLANs Using Multiple Radios: Applications, Experience and Evaluation," Proc. of Mobicom, (2006), pp. 50-61.
Bychkovsky, Vladimir, et al., "A Measurement Study of Vehicular Internet Access Using in Situ Wi-Fi Networks," Mobicom, Sep. 24-29, 2006, Los Angeles, California, 12 pages.
Cabspotting, http://www.cabspotting.com, Mar. 7, 2012, 1 page.
Camp, Joseph, et al., "Modulation Rate Adaptation in Urban and Vehicular Environments: Cross-Layer Implementation and Experimental Evaluation," MobiCom, Sep. 14-19, 2008, San Francisco, California, 12 pages.
Cartel, http://cartel.csail.mit.edu/doku.php, Mar. 7, 2012, 7 pages.
CAR 2 CAR Communication Consortium, http://car-to-car.org., 1 page.
Chen, Bin Bin, et al., "MobTorrent: A Framework for Mobile Internet Access from Vehicles," IEEE, (2009), 9 pages.
Chesire, Maureen, et al., "Measurement and Analysis of a Streaming-Media Workload," Proc. of USITS, Mar. 2001, 12 pages.
Comparison of Memory Cards, http://en.wikipedia.org/wiki/Comparison_of_memory_cards, 15 pages.
IBM ILOG CPLEX Optimizer, http://www-01.ibm.com/software/integration/optimization/cplex-optimizer, 3 pages.
Crawdad, "Crawdata Metadata Structure," http://crawdad.cs.dartsmouth.edu/meta.php?name=rice/ad_hoc_city, Mar. 7, 2012, 11 pages.
Decouto, Douglas S.J., et al., "A High-Throughput Path Metric for Multi-Hop Wireless Routing," Wireless Networks, (2005), vol. 11, pp. 419-434.
Deshpande, Pralhad, et al., "Predictive Methods for Improved Vehicular WiFi Access," Mobisys., Jun. 22-25, 2009, Krakow, Poland, 14 pages.
Draves, Richard, et al., "Routing in Multi-Radio, Multi-Hop Wireless Mesh Networks," MobiCom, Sep. 26-Oct. 1, 2004, Philadelphia, Pennsylvania, 15 pages.
Emulab, "Total Network Testbed," www.emulab.net, Mar. 7, 2012, 2 pages.
Eriksson, Jakob, et al., "Cabernet: Vehicular Content Delivery Using WiFi," Mobicom, Sep. 14-19, 2008, San Francisco, California, 12 pages.
F1 Score, "Wikipedia, the Free Encyclopedia," http://en.wikipedia.org/wiki/F1_score, Mar. 7, 2012, 2 pages.
Ghosh, Joy, et al., "On Profiling Mobility and Predicting Locations of Campus-Wide Wireless Network Users," Proc. of Realman, (2006), pp. 55-62.
Grossglauser, Matthias, et al., "Mobility Increases the Capacity of Ad Hoc Wireless Networks," IEEE/ACM Transaction on Networking, Aug. 2002, vol. 10, No. 4, pp. 477-486.
Hadaller, David, et al., "Vehicular Opportunistic Communication Under the Microscope," Mobisys, Jun. 11-13, 2007, San Juan, Puerto Rico, 14 pages.
Ho, Tracey, et al., "On Randomized Network Coding," Randomized Network Coding, Oct. 6, 2003, 10 pages.
Impedance Matching, "Wikipedia, The Free Encyclopedia," (2012), 10 pages.
Worldwide Pricelist for iPhone 3G Plans, http://www.unwiredview.com/2008/07/16/worldwide-pricelist-for-iphone-3g-plans, (2012), 5 pages.
Juang, Philo, et al., "Energy-Efficient Computing for Wildlife Tracking: Design Tradeoffs and Early Experiences with ZebraNet," ASPLOS, (2002), 12 pages.
Laptop & Smartphone Users Prefer Wi-Fl to 3G; Willing to Pay for Citywide Wi-Fi, http://www.teleclick.ca/2009/-2/laptop-willing-to-pay-for-citywide-wi-fi, Mar. 7, 2012, 2 pages.
Lee, Kevin C., et al., "First Experience with CarTorrent in a Real Vehicular Ad Hoc Network Testbed," MOVE '07, May 6-12, 2007, 6 pages.
Liu, Tong, et al., "Mobility Modeling, Location Tracking, and Trajectory Prediction in Wireless ATM Networks," IEEE Journal on Selected Areas in Communication, Aug. 1998, vol. 18, No. 6, pp. 922-936.
L.M.S.C. of the IEEE Computer Society, "Wireless LAN Merdium Access Control (MAC) and Physical Layer (PHY) Specifications," IEEE, (1999), 90 pages.
Local Search Web Services, http://local.yahooapis.com/LocalSearchService/V3/localSearch, 8 pages.
LP Solve: Linear Programming Code, http://www.cs.sunysb.edu/~algorith/implement/lpsolve/implement.shtml, (2012), 1 page.
Matching, http://en.wikipedia.org/wiki/Matching, (2012), 3 pages.
McNamara, Liam, et al., "Media Sharing Based on Colocation Prediction in Urban Transport," MobiCom, Sep. 14-19, 2008, San Francisco, California, 12 pages.
Memory Cards, "Comparison of Memory Cards," http://en.wilipedia.org/wiki/comparison_of_memory_cards, (2012), 15 pages.
Meraki MR58, http://www.meraki.com/products_services/access_points/MR58, (2012), 3 pages.
Mobile Broadband Review, http://www.mobile-broadband-services-review.toptenreviews.com/, 7 pages.
Navada, Vishnu, et al., "Mobisteer: Using Steerable Beam Directional Antenna for Vehicular Network Access," Mobisys, Jun. 11-14, 2007, San Juan, Puerto Rico, 14 pages.
Nicholson, Anthony J., et al., "BreadCrumbs: Forecasting Mobile Conectivity," MobiCom '08, Sep. 14-19, 2008, San Francisco, California, 12 pages.

Nomadio, Inc., "AWE Mesh Router Assured Wireless Ethernet," Version 3.2, (2012), 5 pages.

Oliver, Earl, "A Survey of Platforms for Mobile Networks Research," Mobile Computing and Communications Review, (2008), vol. 14, No. 4, pp. 56-63.

Pack, Sangheon, et al., "Fast Inter-AP Handoff Using Predictive Authentication Scheme in a Public Wireless Lan," Proc. of Networks Conference, Aug. 2002, 12 pages.

* cited by examiner

▷ $Input: \ Intv, WCap, InCap, OutCap, CT, AP, size, has, Q$
▷ $Output: \ x(f, i, a) \text{ and } D(v, f, a)$

Maximize: $\sum_v \sum_f \sum_{a \in AP(v)} Q(v,f) D(v,f,a) - \gamma \sum_{i \in I} \sum_{a \in A} \sum_f x(f,i,a)$

Subject to:

[C1] $\sum_f D(v,f,a) \leq WCap(a) \times CT(a,v) \quad \forall v, a \in AP(v)$

[C2] $\sum_{a \in AP(v)} D(v,f,a) \leq size(f) - has(v,f) \quad \forall v, f$

[C3] $D(v,f,a) \leq has(a,f) + \sum_{s \in I} x(f,i,a) \quad \forall v, f, a \in AP(v)$

[C4] $\sum_{i \in I} x(f,i,a) \leq size(f) - has(a,f) \quad \forall f, a \in A$

[C5] $\sum_{i \in I} \sum_f x(f,i,a) \leq InCap(a) \times Intv \quad \forall a \in A$

[C6] $\sum_{a \in A} \sum_f x(f,i,a) \leq OutCap(i) \times Intv \quad \forall i \in I$

Fig. 2

|       | Ipaq 910  | Desktop  |
|-------|-----------|----------|
| Write | 62.715 ms | 1.35 ms  |
| Read  | 4.66 ms   | 0.272 ms |

Fig. 3 (Table 1)

| Batch size | 110 packets | | 70 packets | | 35 packets | |
|---|---|---|---|---|---|---|
| Device | Phone | Desktop | Phone | Desktop | Phone | Desktop |
| Encoding | 12.19s | 0.0228s | 4.79s | 0.0088s | 1.18s | 0.0021s |
| Decoding | 8.22s | 0.017s | 3.27s | 0.0067s | 0.809s | 0.0012s |

Fig. 4 (Table 2)

| # cars | 10 | 20 | 50 | 100 | 200 | 370 |
|---|---|---|---|---|---|---|
| Total download ratio | 1 | 1.32 | 1.15 | 1 | 1 | 1 |

Fig. 13 (Table 3)

| Packet type | Avg KB | % of total traffi |
|---|---|---|
| Controller to APs | 192 | 0.006 |
| APs to controller | 1483 | 0.048 |
| Content server to AP data | 3078200 | 99.946 |
| Vehicles to APs | 49122 | 1.599 |
| APs to vehicles data | 3023100 | 98.401 |

Fig. 15 (Table 4)

| | Average Latency (ms) |
|---|---|
| Pre-processing for LP | 1307 |
| LP Computation | 6512 |
| LP Result Processing | 32 |
| Total | 7851 |

Fig. 16 (Table 5)

|  | Download (kB) | Play time (sec) |
| --- | --- | --- |
| No replication | 29297 | 3662 |
| Wireline | 71930 | 8991 |
| Wireline + Mesh | 79440 | 9930 |
| Full replication | 92493 | 11562 |

Fig. 18 (Table 6)

|  | Download (kB) | Play time (sec) |
| --- | --- | --- |
| No replication | 16857 | 2107 |
| Wireline | 123175 | 15387 |
| Wireline + Mesh | 130827 | 16353 |
| Full replication | 136479 | 17060 |

Fig. 19 (Table 7)

|  | No replication | | Wireless replication | |
| --- | --- | --- | --- | --- |
|  | Car 1 | Car 2 | Car 1 | Car 2 |
| AP1 | 0 | 0 | Upload 780 pkts | Download 780 pkts, 20 fi |
| AP2 | 0 | 0 | Download 1159 pkts, 20 fi | Upload 1159 pkts |

Fig. 20 (Table 8)

VEHICULAR CONTENT DISTRIBUTION

CROSS-REFERENCE TO RELATED APPLICATION

This patent application is a non-provisional patent application of U.S. provisional patent application Ser. No. 61/291,984 filed on Jan. 4, 2010 and entitled "Vehicular Content Distribution", which is hereby incorporated by reference in its entirety.

STATEMENT OF GOVERNMENT INTEREST

This invention was made in part using funding from the National Science Foundation, Grant Numbers CNS-0916106 and CNS-0546755. The government has certain rights in the invention.

FIELD OF THE INVENTION

The present invention relates generally to the field of vehicular networks and, more particularly, to a techniques for supporting high bandwidth applications in vehicular networks.

BACKGROUND OF THE INVENTION

Vehicular networks have emerged from the strong desire to communicate on the move [43,39,5,4,16]. Car manufacturers all over the world are developing industry standards and prototypes for vehicular networks (e.g., [12,6,37]). Existing works on vehicular networks often focus on low-bandwidth applications, such as credit card payment, traffic condition monitoring [13], Web browsing [5,4], and VoIP in ViFi [5]. They do not focus on supporting high-bandwidth applications (e.g., video streaming) in vehicular networks.

Cellular networks, despite good coverage, have only limited bandwidth and can incur high costs. For example, most cellular service providers in the US, like AT&T, T-mobile, Sprint, and Verizon, charge roughly $60/month for 5 GB data transfer and $0.2/MB afterwards. 5 GB data transfer can only support 0.1 Mbps for 111 hours (<5 days)! The cellular service price in many other countries are similar or even higher [40]. Moreover, many mobile broadband providers restrict or limit large data exchanges, including streaming audio, video, P2P file sharing, JPEG uploads, VoIP and automated feeds [46]. According to the international poll of 2700 Devicescape customers, 81% smartphone users prefer Wi-Fi over 3G cellular for data services [34]. This implies a stronger need for supporting high-bandwidth applications in vehicular networks using Wi-Fi. However, this is challenging since vehicles often move at high speed and thus the contact time between vehicles and access points (APs) tends to be short (e.g., [12] reported that 70% of connection opportunity is less than 10 seconds). In addition, it can be expensive to provide dense high-speed Internet coverage at a large scale. As a result, if vehicles fetch desired content on-demand from the Internet during their contact with an AP (as in [5,12]), the amount of data fetched may be insufficient to sustain the data rate required by applications such as video streaming when vehicles are outside the communication range of any APs.

A need, therefore, exists for a technique for enabling vehicular networks to support high-bandwidth applications, such as video streaming, that addresses these and other challenges.

SUMMARY OF THE INVENTION

Embodiments of the present invention address the above and other challenges to supporting high-bandwidth applications in vehicular networks, by first making two observations: First, the local wireless capacity is often an order of magnitude higher than typical Internet connectivity. Thus if content is proactively distributed to APs that a vehicle is likely to visit beforehand, the vehicle can potentially fetch a large amount of data during its contact with the APs. Second, it is possible to leverage the mobility of the vehicles to increase the coverage of the Internet connectivity. In particular, even if only a small fraction of APs have Internet connectivity, by having the vehicles themselves relay content, one can potentially replicate content to a much larger number of APs. In essence, vehicle mobility has the potential to significantly increase the network capacity [18] and reduce future content access delay. Note that many mobile devices, such as smartphones, support use of additional cheap external storage cards, which can help mitigate the storage concerns to carry traffic for other users in the system [36].

Therefore, through intelligent content replication, embodiments of the present invention can effectively exploit the synergy among (i) Internet connectivity, which is persistent, but has limited coverage and relatively low bandwidth, (ii) local wireless connectivity, which has high bandwidth but short contact duration, (iii) vehicle relay connectivity, which has high bandwidth but high delay, and (iv) mesh connectivity among Aps, which has high bandwidth but low coverage, to support high-bandwidth applications. In particular, replication is optimized through wireline network and wireless mesh networks based on predicted mobility and traffic demands. Moreover, the mobility of the vehicles is opportunistically exploited to extend the coverage of the Internet and mesh connectivity. Even if only a small fraction of APs have Internet and mesh connectivity, by having the vehicles themselves relay content, one can potentially replicate content to a much larger number of APs. In essence, vehicle mobility has the potential to significantly increase the network capacity [18] and reduce future content access delay. Note that many mobile devices, such as smartphones, support the use of cheap external storage cards, which can help mitigate potential storage concerns regarding carrying traffic for other users in the system [36].

For, example, the present invention provides a method for providing an electronic content to a vehicle from one or more access points within a network using a controller. The controller divides the electronic content into one or more files wherein each file contains at least one packet, and generates two or more random linear combinations of the packets within each file. For each file, each random linear combination of the packets is replicated to a different access point within the network in accordance with a linear program. Thereafter, the electronic content is provided to the vehicle using at least one of the different access points.

In addition, the present invention provides a system that includes at least one vehicle, one or more access points within a network, and a controller communicably coupled to the one or more access points. The controller is configured to: (i) divide the electronic content into one or more files wherein each file contains at least one packet, (ii) generate two or more random linear combinations of the packets within each file, and (iii) for each file, replicate each random linear combination of the packets to a different access point within the network in accordance with a linear program. At least one of the different access points provides the electronic content to the vehicle.

Furthermore, the present invention provides a method for providing electronic content to a vehicle using a network of access points. The controller determines a set of nearest trajectories for the vehicle in a location database that match a recent location history for the vehicle. For each determined nearest trajectory, one or more mobility trajectories are determined for the vehicle, and a set of access points are determined that correspond to the determined mobility trajectories for the vehicle. Thereafter, the electronic content is provided to the vehicle using at least one of the determined set of access points.

The present invention also provides a system that includes at least one vehicle, one or more access points within a network, and a controller communicably coupled to the one or more access points. The controller, is configured to: (i) determine a set of nearest trajectories for the vehicle in a location database that match a recent location history for the vehicle, (ii) for each determined nearest trajectory, determine one or more mobility trajectories for the vehicle, and (iii) determine a set of access points corresponding to the determined mobility trajectories for the vehicle. The electronic content is provided to the vehicle using at least one of the determined set of access points.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 2 illustrates the formulation of a linear program to solve a problem of determining how much content to replicate in accordance with embodiments of the present invention;

FIG. 3 includes a table presenting micro benchmarks for the I/O performance of embodiments of the present invention;

FIG. 4 includes a table presenting the costs incurred by intra encoding and decoding for different devices and file sizes in accordance with embodiments of the present invention;

FIG. 13 includes a table presenting the benefits of inter-flow network coding in accordance with embodiments of the present invention;

FIG. 15 includes a table that presents the average per-interval control message overhead in accordance with embodiments described herein;

FIG. 16 includes a table that presents the average per-interval control processing delay in accordance with embodiments described herein;

FIG. 18 includes a table that presents the throughput of wireline and mesh replication in the 802.11b testbed in accordance with the embodiments described herein;

FIG. 19 includes a table that presents the throughput of wireline and mesh replication in the 802.11n testbed in accordance with the embodiments described herein;

FIG. 20 includes a table of a comparison between performance with and without vehicular replication in accordance with the embodiments described herein;

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

In general, embodiments of the present invention provide a novel system, referred to as Vehicular Content Distribution (VCD), for enabling high-bandwidth content distribution in vehicular networks. According to one embodiment, in VCD, a vehicle opportunistically communicates with nearby access points (APs) to download the content of interest. To fully take advantage of such transient contact with APs, content can be proactively pushed to APs that the vehicles will likely visit in the near future. In this way, vehicles can enjoy the full wireless capacity instead of being bottlenecked by the Internet connectivity, which is either slow or not even available. To realize this vision, embodiments of the present invention provide a new algorithm for predicting the APs that will soon be visited by the vehicles. Embodiments of the present invention further then provide a series of replication optimization techniques to enable the synergy among (i) Internet connectivity (which is persistent but has limited coverage and low bandwidth), (ii) local wireless connectivity (which has high bandwidth but short contact duration), (iii) vehicle relay connectivity, which has high bandwidth but high delay, and (iv) mesh connectivity among Aps, which has high bandwidth but low coverage The effectiveness of the VCD system of embodiments described herein has been demonstrated through trace-driven simulation and Emulab emulation using real taxi traces, along with a full-fledged prototype deployment in two vehicular networks (802.11b and 802.11n).

Figure 1:
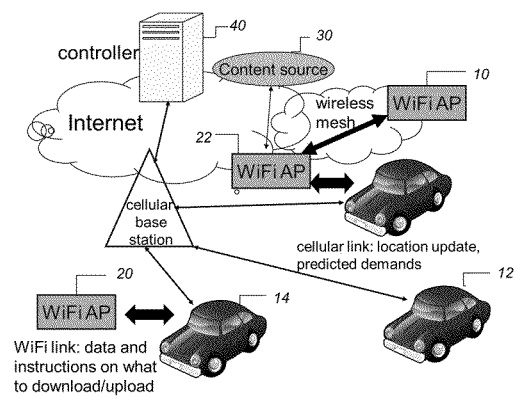
FIG. 1 is a block diagram of a Vehicular Content Distribution system of one embodiment of the present invention.

To realize the above vision, embodiments of the present invention develop a novel Vehicular Content Distribution (VCD) system for enabling high-bandwidth content distribution in vehicular networks. As illustrated in FIG. 1, the VCD system of one embodiment can consist of vehicles 10, 12, 14, access points (APs) 20, 22 with and without Internet access, content servers 30 on the Internet (e.g., Web servers), and a controller 40. According to one embodiment, vehicles can submit location updates and content requests to the controller via cellular links. The controller can optimize the replication strategy based on predicted mobility and traffic demands, and instruct the APs to carry out the replication strategy. To enhance reliability, the controller can be replicated on multiple nodes. APs can be deployed along road sides (e.g., at gas stations and/or coffee shops) to allow vehicles on the road to opportunistically communicate with the system. The APs can prefetch content as instructed by the controller. Whenever a vehicle encounters an AP, the AP can send back the requested content from local storage if the content is available locally. Otherwise, the AP tries to fetch the content from an AP in the same mesh network if one is available. If no such AP is found, it fetches content from the Internet when it has Internet connectivity. In addition to sending the content that the vehicle itself needs, the AP may further fetch from the vehicle some content, which can be served to other passing vehicles later, or download content to the vehicle, which can then be relayed to other APs.

VCD system of embodiments described herein is easy to deploy in practical settings. For example, a vehicular service provider (VSP) can install its own APs and/or subscribe to existing wireless hotspot services. Since it is easier to place a stand-alone AP than to hook it up with an Internet connection, VCD is designed to explicitly take advantage of APs both with and without Internet connectivity. Note that an AP without Internet connectivity is still useful and can serve as a static cache (e.g., a vehicle uploads content to such an AP, which can later serve the content to other passing vehicles).

A VSP can offer content distribution service to taxis, buses, subways, and personal vehicles. While the techniques described herein can be applicable to a variety of vehicular networks, the following description of embodiments of the present invention focuses on taxis and buses that offer high-bandwidth content distribution as a value added service to their passengers. These vehicles have low-cost mobile devices on board for playing downloaded content. Such mobile devices can be installed by the taxi/bus companies or VSPs. The mobile devices can be powered by the vehicles, so battery power is not an issue. The mobile devices can interact with APs and the controller in the VCD system of embodiments described herein to report required information (e.g., location update and predicted traffic demands) and follow their instructions.

According to embodiments described herein, contributions of the VCD system include novel techniques for: (i) optimized wireline and mesh replication optimization, (ii) opportunistic vehicular replication, and (iii) a new algorithm for mobility prediction. Moreover, the VCD system has undergone a thorough evaluation through simulation, emulation, and testbed experiments.

To fully take advantage of short contact time between APs and a passing vehicle, in one embodiment, a series of replication techniques can be used to replicate content in advance to the APs that will soon be visited by the vehicle. A distinctive feature of the replication scheme is that it is based on optimization. Specifically, a linear program (LP) is explicitly formulated to optimize the amount of data that can be delivered before the deadline under the predicted mobility pattern and traffic demands subject to given resource constraints (e.g., short contact time and limited link capacity). The formulation involves addressing challenging modeling issues and is a valuable contribution. In contrast, previous works either focus exclusively on protocol-level optimization of onehop communication between vehicles and APs (e.g., [5, 11, 13, 25]), or rely on heuristics to guide data replication [46], or completely ignore the resource constraints [47], which are crucial in vehicular networks. The present formulation is highly flexible and can support wireline replication (Section 1.2), wireless replication (Section 1.3), and mesh replication (Section 1.4). The formulation can be efficiently solved using standard LP solvers (e.g., lp_solve [48] and cplex [49]) owing to modern interior-point linear programming methods.

To further extend the coverage of the Internet and wireless mesh networks, vehicular replication was developed to opportunistically take advantage of local wireless connectivity and vehicular relay connectivity (Section 1.5). Different from traditional vehicle-to-vehicle (v2v) communication, the present invention leverages the APs as the rendezvous points for replicating content among vehicles since vehicle-to-AP communication is easier to deploy and such contacts are generally easier to predict than v2v contacts. Finally, network coding can be used to further compress replication traffic (See Section 1.6 below).

With respect to the new algorithm for mobility prediction, in order for the replication optimization algorithms of embodiments described herein to operate effectively, it may be beneficial to predict the set of APs a vehicle will visit in a future interval with high accuracy. Given the high driving speeds, diverse road and traffic conditions, infrequent location updates, irregular update intervals, and a lack of up-to-date street maps, accurately predicting mobility can be challenging in vehicular networks. As shown below in Section 4, algorithms designed for other less mobile environments may not perform well in vehicular networks. Accordingly, embodiments of the present invention develop a novel mobility prediction algorithm based on the idea of voting among K nearest trajectories (KNT) (See Section 2 below) that consistently outperforms existing prediction algorithms such as the recently proposed second-order Markov model [35,26] (See Section 4 below).

Extensive trace-driven simulations were conducted to evaluate the performance of the VCD system of embodiments described herein using real mobility traces using San Francisco taxi [10] and Seattle bus traces [50] (Section 5). The results show that the VCD system of embodiments described herein significantly improves the amount of content received by applications. More specifically, the results show that VCD is capable of downloading 3-6× as much content as no replication, and 2-4× as much content as wireline or vehicular replication alone; mesh replication further helps to improve throughput by up to 22%. The benefit of VCD further increases as the gap between wireless and wireline capacity enlarges and the AP density increases. In addition, a full-fledged prototype VCD system has been developed that supports real video streaming applications running on smartphones and laptops (Section 3, 6 and 7).

A full-fledged prototype VCD system that supports real video streaming applications running on smartphones and laptop clients was developed and deployed using 802.11b and 802.11n. Live road tests suggest that the system of embodiments described herein is capable of providing video streaming to smartphone clients and laptop clients at a vehicular speed. To further evaluate the performance of VCD at scale, the unmodified APs and controller were run together with emulated vehicles in the Emulab [15] testbed. The experiments showed that Emulab results closely follow the simulator results and that the implementation of embodiments described herein is efficient and light-weight.

1. Optimizing Replication

In this section, an overview of the system of embodiments described herein is first presented. Then a series of novel techniques for optimizing replication in accordance with an embodiment of the present invention are provided.

1.1 Overview

According to one embodiment, at the beginning of every interval, the controller can collect the inputs used to compute the replication strategy. The controller can compute the replication strategy during the current interval, so that it can maximize user satisfaction during the next interval (See Section 1.2 below). User satisfaction can be used in the next interval as the objective, since replication in the current interval is often too late to satisfy the traffic demands in the same interval. The controller can then inform the APs of the replication strategy through the Internet or cellular network (in case the APs do not have Internet connectivity). Cellular networks can be used to send control messages as they are small. When a vehicle contacts an AP, the AP can transfer the content according to the optimization results (step 1). When this finishes, the vehicle may still have demand that has not yet been satisfied (e.g., due to inaccurate prediction or insufficient capacity to replicate all the interesting content). In one embodiment, the vehicle can first download all the content that the vehicle is interested in and is available locally at the AP (step 2). Then it can download the remaining content in which it is interested from the Internet when the AP has Internet connectivity (step 3). Parallel to the Internet download, the vehicle can take advantage of wireless capacity by transferring files to and from APs (step 4, see Section 1.3 below).

1.2 Optimizing Wireline Replication

One high level goal of embodiments described herein is to find a replication strategy that maximizes user satisfaction subject to the available network capacity. Specifically, a goal is to determine how to replicate files to APs during the current interval to maximize the amount of useful content that can be downloaded by vehicles when they meet the APs in the next interval. When it is desirable to support delay sensitive applications, only content that are downloaded before the deadline should count and the other content that to already misses the deadline should be excluded from consideration for replication. This question has two parts: (i) in what form to replicate the content, and (i) how much to replicate for each file.

To answer the first question, it can be noted that replicating original content introduces two major problems. First, it may be inefficient for serving multiple vehicles. Suppose multiple vehicles are interested in the same file and have downloaded different portions of the files before their contacts with an AP. If they visit the same AP, in order to satisfy all vehicles it maybe necessary to replicate the union of the packets they need, which is inefficient. For example, vehicles 1 and 2 are both interested in file 1. Vehicle 1 has downloaded the first half and vehicle 2 has downloaded the second half before they encounter the AP. The complete file should be replicated to satisfy both vehicles. Second, replicating original files is also unreliable. Consider a vehicle that is predicted to visit three APs but in fact it only visits two of the three APs, which is quite common due to high unpredictability of vehicular movement. If the file is just split into three and one part is transferred to each AP, then the vehicle will not get the complete file. However, if the files are split into two and one part is transferred to each AP, the vehicle still may not get the complete file, since it may get two redundant pieces (e.g., when it visits the two APs that both have the first half of the file).

According to one embodiment, network coding can be applied to solve both problems. Specifically, the video content can be divided into multiple files, each containing multiple packets, and network coding can be used to generate random linear combinations of packets within a file. With a sufficiently large field, the likelihood of generating linearly independent packets is very high [20]. For a file of n packets, a vehicle can decode it as long as it receives n linearly independent packets for the file. Since this network coding operates on a single file, it can be called intra-flow coding to differentiate it from inter-flow network coding, which combines multiple files and is described below in Section 1.5.

Intra-flow network coding solves redundancy problems in a multi-vehicle case, since each linearly independent packet adds value. In the above example of two vehicles, only one half worth of file content may need to be replicated to satisfy both users, reducing bandwidth consumption by half. Intra-flow network coding further solves reliability issues in to the single vehicle case by incorporating redundancy. In the above example the file of interest can be split into two, three linear combinations of these two pieces can be randomly generated, and one combination can be replicated to each AP so that the vehicle can decode the file once it gets any two of the three pieces.

Note that network coding (not just source coding) is needed in order to avoid redundancy during replication without finegrained coordination. That is, APs should re-encode data before they replicate data to vehicles and other APs. For example, AP 1 has a complete file 1, and sends to vehicle 1 half the file, which is relayed to AP2; similarly AP 1 sends half of the file 1 to vehicle 2, which relays it to AP2. In order to avoid replicating duplicates to AP 2, AP 1 should re-encode the data before sending to the vehicles. The network coding cost and optimization is described in Section 3.2.

Using network coding, embodiments of the present invention transform the original problem of determining which packets to replicate into the problem of determining how much to replicate for each file. To solve the latter problem, embodiments of the present invention formulate a linear program, as shown in FIG. 2, where v is a vehicle, f is a file, a is an AP, i is a node with Internet connectivity (which may or may not be an AP, e.g., a Web server), Intv is an interval duration, A is the set of all the APs, I is the set of all the nodes with Internet connectivity, AP(v) is the set of APs that vehicle v will visit, Q(v, f) is the probability that v is interested in file f, D(v, f,a) is the amount of traffic in file f vehicle v should download from AP a during a contact in the next interval, $x(f,n_1,n_2)$ is the amount of traffic in file f to replicate from node n1 to node n2 during the current interval, CT(a, v) is average contact time of vehicle v at AP a, WCap is wireless capacity, InCap is incoming Internet access link capacity, OutCap is outgoing Internet access link capacity, has(n, f) is amount of file f a node n has, and size(f) is the size of file f.

A few explanations follow. The first term in the objective function, namely, $\Sigma_v \Sigma_f \Sigma_{a \in AP(v)} Q(v, f)D(v, f,a)$, quantifies user satisfaction, which is essentially the total traffic downloaded by a vehicle, denoted as D(v, f,a), weighted by the probability for vehicle v to be interested in file f, denoted by Q(v, f). The second term in the objective represents the total amount of replication traffic. Embodiments of the present invention include both terms to reflect the goals of (i) maximizing user satisfaction, and (ii) for the replication strategies to that support the same amount of traffic demands, showing a preference for the one that consumes less traffic. Since the first objective may be more important, embodiments of the present invention can use a small weighting factor γ for the second term just for tie breaking (i.e., when the first objective is the same, the one that has the lowest replication traffic is preferred). The value of γ should be small enough to ensure it does not dominate the first term, The evaluation discussed herein uses γ=0.001.

Constraint C1 in FIG. 2 enforces that the total amount of traffic downloaded from an AP during a contact is bounded by the product of AP's wireless capacity and average contact duration. Constraint C2 ensures that the total content downloaded for each file does not exceed the total file size minus the amount of file the vehicle already has before the download. Constraint C3 encodes the fact that the amount of file the vehicle can download from an AP cannot exceed what the AP already has plus what will be replicated to the APs through the Internet during the current interval. Constraint C4 indicates that the total replication traffic in file f towards an AP is bounded by the file size minus the amount that the AP already has. Constraints C5 and C6 reflect that the total replication traffic through the Internet does not exceed the access link capacity. The formulation can support APs with and without Internet access by setting Internet capacity to zeros for APs without Internet access.

As shown in FIG. 2, according to one embodiment, Intv, WCap, InCap, OutCap, CT, AP, size, has, and Q may be needed. The Intv is a control parameter that determines how frequently the optimization is performed. In the evaluation discussed herein, Intv was set to three minutes, which gives a good balance between (i) achieving accurate mobility prediction and (ii) limiting the optimization overhead, since both (i) and (ii) decrease as Intv increases. The next three inputs on link capacity—WCap, InCap, and OutCap—can be known in advance and change infrequently. CT can be estimated using historical data and only needs to be updated infrequently. For ease of estimation, in the evaluation discussed herein CT(a,v) was set to the average duration of all contacts from the trace. AP can be obtained by either letting a vehicle run a mobility prediction algorithm locally or having it send several of its recent GPS coordinates to the controller, which will perform mobility prediction. size, has, and Q can be reported by the vehicles either through a Wi-Fi link during a contact with an AP or via a cellular link during another time. A vehicle can predict what future content to request based on the previous and current requests. For streaming content, it may be relatively easy to predict as most users will request the subsequent frames. Further, demand prediction has been a well-researched problem in many domains [4, 45] and embodiments of the present invention can leverage solutions previously developed. All the control information is small and can be easily compressed by sending delta from the previous update.

The nodes on the Internet can replicate traffic according to x(f, i, a). Since the contact time cannot be predicted precisely, x(f, i, a) and D(v, f, a) are used to control the relative replication and download rates across different files using the weighted round robin scheduling. This enhances robustness against errors in estimating the inputs. For example, if x(f1, i, a)=2·x(f2, i, a), file 1 is downloaded twice as fast as file 2. In this way, network resources can be fully utilized even if contact time or network capacity have estimation errors.

1.3 Optimizing Wireless Relay Replication

Next embodiments of the present invention consider replication through wireless relay. An issue here is how to model wireless relay capacity under high variability and uncertainty, which is typical of vehicular networks. Given such high variability, optimizing replication for each individual vehicle separately can be both expensive and not very robust. Instead embodiments of the present invention use aggregation to achieve robustness. Specifically, according to one embodiment, vehicles moving from one AP to another can be considered as data ferries between the two APs and create a virtual link between them. The capacity of the virtual link can depend on two factors: (i) the number of vehicles traversing between the two APs and (ii) the amount of content that can be relayed by one vehicle moving between them. The latter can be determined by the contact duration and fraction of contact time devoted to relaying content (as opposed to serving its own traffic).

Based on this abstraction, embodiments of the present invention extend the LP formulation in FIG. 2 as follow. First, $y(f, a_1, a_2)$ can be introduced to denote the amount of traffic to be relayed via wireless from AP $a_1$ to AP $a_2$ for a given file f in the current interval. The relay traffic should satisfy wireless relay capacity constraints, i.e., the total amount of outgoing replication traffic from an AP plus the total amount of incoming replication traffic to the AP does not exceed the reserved wireless relay capacity multiplied by the average contact time. Embodiments of the present invention take the maximum over the outgoing traffic to all the other APs to reflect the broadcast nature of the outgoing traffic: once the content is replicated to a vehicle, which moves to multiple other APs, the same content can be replicated to more than one AP without incurring additional resources from the source AP. In comparison, the incoming traffic from all the other APs can be summed up, since they each consume separate upload bandwidth. Let RelayF denote the fraction of wireless capacity dedicated for wireless relay. For any AP one has $$\sum_f \max_{a_2} y(f, a_1, a_2) + \sum_f \sum_{a_2} y(f, a_2, a_1) \leq \quad (1)$$

$$WCap(\mid a_1) \times CT(a_1) \times RelayF$$

Second, constraint C1 in FIG. 2 can be modified to reflect the fact that part of the wireless capacity is reserved for wireless relay and only the remaining can be used for downloading the content for its own interest. So constraint C1 can be revised to $$\sum_f D(v, f, a) \leq WCap(a) \times CT(a) \times (1 - RelayF) \quad (2)$$

Finally, constraint C3 can be modified to encode the fact that the amount of file that a vehicle can download from an AP cannot exceed what the AP already has plus what will be replicated to the AP through either the Internet or wireless. The amount that can be replicated through wireless is $y(f, a_2, a) \times N_{path}$. Therefore one has $$D(v, f, a) \leq has\,(a, f) + \sum_{a_2 \neq a} y(f, a_2, a) \times N_{path} + \sum_{s \in I} x(f, s, a) \quad (3)$$

where I is the union of APs with Internet access plus all the content servers.

1.4 Optimized Mesh Replication

If some APs along the road are close together, they can form a mesh network. The mesh connectivity indicates that (i) content can now be replicated to the APs using mesh connectivity in addition to wireline connectivity, and (ii) if a vehicle meeting AP1 requests a file that AP1 does not have, it is more efficient to fetch from its mesh network (if there is an AP having the file) than fetching via the slow wireline access link. A neighboring AP in the mesh network can have the file either due to explicit replication or opportunistically caching from earlier interactions. To support (i), the following modifications are made to the replication formulation in FIG. 2. Let MCap(a', a) denote the capacity of a wireless link from AP a' to a in the mesh network, which can be different from the capacity of Wireless links between vehicles and APs (WCap). Let z(f, a', a) denote the amount of content to replicate from AP a' to a for file f through the mesh network. Let ETX(a', a) denote the average number of transmissions required to send a packet from a' to a through the mesh and can be easily estimated by measuring link loss rate using broadcast probes as in [52]. The modifications include (1) adding $-\gamma \Sigma_f \Sigma_{(a',a) \in mesh} z(f,a',a)$ to the objective function to prefer the replication that uses less wireline and mesh replication traffic among the ones that support the same traffic demands, (2) adding $+\Sigma_{(a',a) \in mesh} z(f,a',a)$ to the right-hand side of [C3] to indicate a node can download from AP a any content that is already available at a or replicated to a through either the wireline or mesh network, (3) adding the following two new constraints:

$$z(f, a', a) \le \text{has } (a', f) \text{ and} + \sum_{f,(a',a) \in mesh} \frac{ETX(a, a')z(f, a', a)}{MCap(a', a)} \le 1.$$

The former constraint ensures AP a' cannot replicate more content than it has. The latter is interference constraint, which enforces that total active time of all mesh nodes cannot exceed 100% assuming all nodes in the mesh network interfere with each other. Note that its left-hand side computes activity time by multiplying the replicated content by the expected number of transmissions normalized by the wireless capacity.

To support (ii), when AP a receiving a request for a file that it does not have locally, it first tries to get from AP a' in the same mesh if the end-to-end throughput (approximated as MCap(a,a')/ETX(a',a)) is higher than the wireline access link; only when no such AP is found, does it fetch using the wireline access link.

1.5 Leveraging Opportunistic Vehicular Replication

The effectiveness of optimization techniques depends on the accuracy of prediction. In vehicular networks, it can be challenging to accurately predict mobility trajectory. It can be even more challenging to estimate the duration of the contact time. The high uncertainty of contact time arises partly from uncertainty in mobility and partly from uncertainty in wireless medium characteristics, e.g., interference and obstacles in the vicinity, current antenna orientation, and/or the like. As shown in the testbed experiment, discussed below in Section 7, the contact time varies a lot even when passing the AP at (almost) the same speed.

In addition to wireline and mesh replication, content can also be replicated using vehicles—a vehicle can carry content from one AP to another as it moves. This new form of replication is more effective than traditional vehicle-to-vehicle (V2V) replication, because V2V needs a very large number of vehicles to be effective whereas even a small number of APs can significantly enhance the performance by leveraging the Internet and mesh connectivity among them [52].

One way to support this new vehicular replication is to augment the LP formulation in FIG. 2 with vehicular replication terms, which can produce wireline, mesh and vehicular replication as the final output. However, due to unpredictability in vehicular relay opportunity, the effectiveness of such optimization can be limited. Interestingly, the following simple opportunistic vehicular replication scheme is effective.

Since the wireline fetch is bottlenecked by the slow access link, the wireless link is not fully utilized. Therefore, as mentioned in Section 1.1, parallel to the wireline fetch, a vehicle can take advantage of local wireless connectivity to exchange content with the AP. Such exchange has two benefits: (i) the vehicle can upload content to the AP, which can serve other vehicles later, and (ii) the vehicle can download files, which may serve the user's demand in the future or the vehicle can relay the content to other APs for future service. To enhance effectiveness, embodiments of the present invention can order the files to upload based on the expected future demand for the file at the AP, which can be estimated as $\Sigma\{v: v \text{ visits } AP\} Q(v,f) \text{ demand}(v,f)$, where demand(v,f) is the expected size of file f vehicle v is interested in. An evaluation of this vehicular replication shows that it is highly effective.

1.6 Applying Inter-Flow Network Coding

Suppose two vehicles $v_1$ and $v_2$ will visit the same AP in the next interval, where $v_1$ has file $f_1$ and needs file $f_2$, and $v_2$ has $f_2$ and needs $f_1$. Then instead of replicating $f_1$ and $f_2$ individually to the AP, embodiments of the present invention can replicate $f_1$ xor-ed with $f_2$. If the two files have the same size, xor-ing the files reduces bandwidth consumption by half. Such coding can be called inter-flow coding, since it combines multiple files. As with intra-flow coding, inter-flow coding can be applied to traffic replicated through either the Internet or wireless.

The above example assumes both vehicles have a complete file. In practice, vehicles often have partial replica of some files. For example, assume both $f_1$ and $f_2$ consist of ten packets; $v_1$ has five packets of $f_1$ and needs $f_2$, while $v_2$ has five packets of $f_2$ and needs $f_1$. Then, according to one embodiment 15 packets of $f_1$ xor-ed $f_2$ can be replicated to satisfy both of their demands. In general, how to determine the number of inter-flow coded packets and intra-flow coded packets in order to satisfy the traffic demands can be challenging.

The following describes the approach of one embodiment of the present invention. To leverage inter-flow network coding, embodiments of the present invention can first apply the techniques of Sections 1.2-1.4 above to determine the amount of files to be replicated to each AP. Then inter-flow network coding can be used to compress the traffic. In the second step, embodiments of the present invention focus on how to compress replication traffic from one source, since compressing replication traffic from multiple sources can be done independently.

The following first studies inter-flow coding of two files and then describes how to handle more files. Let variables $x_1$, and $x_2$, and $x_{1 \oplus 2}$ denote the amount of traffic that will be replicated for file 1, file 2, and file 1 xor-ed with file 2. One goal of embodiments of the present invention is to minimize $x_1 + x_2 x_{1 \oplus 2}$ while ensuring that the same amount of traffic demands are satisfied before and after inter-flow coding. It can be proven that the following condition ensures that the demands and $D_{v,1}$ and $D_{v,2}$ can be both satisfied:

$$D_{v,1} \le z_1 + \max\{0, z_{1 \oplus 2} + \min(0, z_2 - n_2)\} \tag{4}$$

$$D_{v,2} \le z_2 + \max\{0, z_{1 \oplus 2} + \min(0, z_1 - n_1)\} \tag{5}$$

where $D_{v,j}$ is vehicle v's demand for file j, $n_1$ and $n_2$ are intra-flow coding batch sizes for file 1 and 2, has(v, j) is the amount of file j vehicle v has, $z_1=x_1+\text{has}(v,1)$, $z_2=x_2+\text{has}(v,2)$, and $z_{1\oplus2}=x_{1\oplus2}+\text{has}(v,1\oplus2)$. A simple linear program (with just three variables) can then be formulated to derive the optimal $x_1$, $x_2$, and $x_{1\oplus2}$ (details omitted in the interest of brevity).

When there are more than 2 files, which two files are selected for inter-flow coding may significantly affect the performance. Since a goal of embodiments of the present invention is to maximize the traffic saving by using inter-flow coding, the pair of files that gives the largest saving may be favored. The problem of finding pairs of files to code can be cast into maximum weighted bipartite matching, where the vertices in the bipartite graph denote the files and the edge weight indicates the amount of traffic saving if the corresponding files are inter-flow coded. One goal of embodiments of the present invention is to find the match that gives the largest total traffic saving. This matching problem can be efficiently solved using a modified shortest path search in the augmenting path algorithm [41]. When the number of files is large, embodiments of the present invention also develop an efficient pruning technique to quickly eliminate file pairs that are not worth coding together (details omitted to save space).

2. Predicting Mobility

If the AP that a vehicle will visit can be predicted, the required content can start to be replicated to the AP well before the vehicle arrives so that the vehicle can enjoy high wireless bandwidth during its download. Predicting mobility for vehicles is challenging because (i) vehicles often move at high speed, which implies that there can be many possible next states and it is difficult to accurately predict transitions to a large number of next states, (ii) the GPS updates often have relatively low frequency (e.g., once per minute) and tend to arrive at irregular intervals, and (iii) the road and traffic conditions are highly dynamic and difficult to predict. Due to these unique characteristics of vehicular networks, existing algorithms optimized for non-vehicular environments (with lower node speeds, higher location update frequency, and constant update interval) may not be as effective in vehicular networks.

To address the challenge, the present invention provides a mobility prediction algorithm for vehicular networks: K Nearest Trajectories (KNT). As shown in Section 4, the KNT algorithm achieves better accuracy on the dataset than using two existing algorithms based on Markov mobility models [35, 26].

It can be observed that the mobility of vehicles exhibits unique structure—a vehicle follows the roads and only makes turns at the street corners or highway exits. This suggests that a good predictor should take into account the speed and direction in the previous interval as well as the underlying road structure. The KNT algorithm of embodiments described herein is able to account for such information without requiring explicit knowledge about the detailed road map (which is difficult to obtain and keep up to date). Given a vehicle $v_0$ and current time $t_0$ the algorithm of one embodiment can predict the set of APs visited by $v_0$ in a future interval $[t_0+\Delta_1, t_0+\Delta_2]$ ($\Delta_2 \geq \Delta_1 \geq 0$) in two steps.

The first step involves finding the K nearest trajectories. The algorithm of one embodiment can first find K existing mobility trajectories in a GPS location database that best match the recent mobility history of the given vehicle. Specifically, a database of past GPS coordinate updates: $\mathcal{D}=\{(v, t, c)\}$, where v is a vehicle, t is the time for the update, and c is the GPS coordinate can be maintained. For any vehicle v and current time t, its mobility history MH can be defined as the set of GPS coordinates reported by v in the past $\delta$ seconds: $MH_v^t = \{c | (v, s, c) \in \mathcal{D} \wedge s \in [t-\delta, t]\}$. A distance function can also be defined:

$$f(MH_{t_0}^{t_0}, MH_v^t) = \sum_{c \in MH_{t_0}^{t_0}} \min_{d \in MH_v^t} \|c - d\|_2.$$

where $\|c-d\|_2$ is the Euclidean distance between the two locations specified by GPS coordinates c and d. Embodiments of the present invention can then find K pairs of (v,t) that minimize $f(MH_{v_0}^{t_0}, MH_v^t)$, i.e., the K nearest trajectories of $(v_0, t_0)$.

The second step involves voting. In particular, according to one embodiment, for each (v,t) among the K nearest neighbors of $(v_0, t_0)$, linear interpolation can be used to obtain its mobility trajectory in its future interval $[t+\Delta_1, t+\Delta_2]$. Embodiments of the present invention can then obtain the set of APs visited by v during this interval. All those APs that are visited by at least T out of K nearest neighbors can then be reported as the predicted set of APs that will be visited by $v_0$ during future interval $[t_0+\Delta_1, t_0+\Delta_2]$.

In step 1 above, to avoid computing $f(MH_{v_0}^{t_0}, MH_v^t)$ for all $(v,t) \in \mathcal{D}$ (which is expensive as $\mathcal{D}$ may contain millions of GPS updates), embodiments of the present invention create an index of $\mathcal{D}$ by (i) discretizing the GPS latitude-longitude coordinate space into $0.0001° \times 0.0001°$ grid squares, and (ii) storing all the (v,t) inside each grid square. Given $(v_0, t_0)$, embodiments of the present invention start from its grid square and use expanded ring search to find C candidate points (v,t) residing in the same or nearby grid squares. K nearest neighbors can then be found among these C candidate points.

To be general, the prediction algorithm does not exploit external knowledge (e.g., certain vehicles have similar trajectory on different days, which may hold for some personal vehicles). When such information is available, the prediction algorithm can incorporated such information when finding nearest trajectories to further improve the accuracy.

The algorithm of one embodiment can have four control parameters: the number of nearest neighbors or trajectories K, the number of candidate points C, the voting threshold T, and the mobility history duration H. In the evaluation, the number of candidate points (C) was kept to 32, the routing threshold (T) was varied between one and two, the number of nearest neighbors (K) was varied from two to 12, and the mobility history (H) was varied from 60 to 180 seconds. The results show that (K=4, T=2, C=32, H=60) consistently give the best performance. As a result, only the results under this parameter setting are reported.

3. Vcd Implementation

The VCD system of embodiments described herein was implemented in both Emulab [15] and a real testbed with smartphone clients. The implemented VCD consisted of a controller, APs, content servers, and clients in vehicles. Emulab and testbed used the same controller, AP, and content server implementation, all of which were implemented as multi-threaded C++/Linux programs. They differ in client implementation. In Emulab, a virtual vehicle program, which can emulate multiple vehicles, was implemented allowing a trace driven emulation of all the cars to be conducted in the trace using a few virtual vehicles. The client in the testbed was implemented on smartphones, which will be described below in Section 3.2.

3.1 System Overview

According to one embodiment, the APs and controller communicate with each other using Transmission Control Protocol (TCP). As noted above in Section 1.1, at the beginning of every interval the controller can collect inputs, computes the replication strategy, and instructs content servers or APs to perform wireline and mesh replication at the desirable rates.

In one embodiment, the communication between APs and vehicles can use User Datagram Protocol (UDP) that sends data at close to the PHY data rate. When a vehicle contacts an AP, it can send a HELLO message that includes (i) a list of files and their sizes that it already has, and (ii) the files it is interested in the current and next intervals. The HELLO message may also include the APs it has visited previously in the current interval. The AP, upon receiving the first HELLO message from the vehicle, can initiate data download to the vehicle according to the four steps described above in Section 1.4. Meanwhile, the vehicle can send buffered GPS updates (generated every 20 seconds in the testbed and every 1 minute in Emulab) indicating its path since it last visited any AP. In step 4, the AP determines a list of files for the vehicle to upload sorted in increasing utility as described in Section 1.3. The AP can use the list of previously-visited APs in the HELLO message to decide what content to ask the vehicle to upload. The AP sends this list in a REQ message. Upon receiving the first REQ message, the vehicle initiates data upload to the AP. Both HELLO and REQ messages are soft state control messages sent periodically once every control interval (500 ms for smartphone, 100 ms for testbed, 1 s for Emulab). These messages also serve as heartbeats to the other party. To achieve efficiency and reliability for data traffic, an AP applies network coding before sending the data it receives. In addition, multiple content servers are used and a central dispatcher is leveraged to distribute requests to an appropriate content server for load balancing For wireless replication, the AP can use the vehicle GPS updates to predict the set of APs the vehicle will visit next and accordingly send relay content to the vehicle. The vehicle, upon receiving the first REQ message from the AP, can initiate data upload. The payload for the packet is set to 1000 bytes for Emulab and simulation, and 1232 bytes for smartphones.

To achieve efficiency and reliability for data traffic, according to one embodiment an AP can apply intra-flow network coding before delivering the data it receives. Inter-flow network coding can also be implemented as an optional optimization to further compress the replication traffic. To increase resilience against packet loss, the AP may optionally add redundancy to the data traffic (the testbed described below used 40% redundancy, and Emulab used no redundancy).

3.2 Client Implementation

The client was implemented on both Windows XP laptops and smartphones. With their enormous popularity and a rapidly growing user base, smartphones are soon expected to become the preferred device for on-the-go communication. Smartphones were, therefore, chosen as one of the underlying hardware platform for the prototype system discussed below (instead or embedded computers as in [16,13]). Implementing on smartphones introduces several challenges: (i) limited Application Program Interfaces (APIs) and often inconsistent implementations, (ii) expensive input/output (I/O), (iii) limited system resources, and (iv) most existing wireless optimizations cannot be implemented due to lack of low level access.

Windows Mobile was chosen as the implementation platform since it offers a richer set of APIs for driver level control, compared to other platforms like Symbian, Blackberry and iPhone [28]. Windows mobile also enjoys considerable market share in North America [42]. The clients were implemented on HP Ipaq 910 Business Manager smartphones with Windows Mobile 6.1 Professional operating system, Marvell PXA270 416 MHz Processor, 128 MB RAM and Marvell SDIO8661 802.11b/g Wi-Fi card, using the .Net Compact Framework. The implementation on smartphones used OpenNet API, and that on Windows uses Managed Wi-Fi API.

With regard to handling expensive input/output, Table 1, shown in FIG. 3, presents micro benchmarks for the I/O performance for read and write of 1450 bytes in the system, comparing it with performance of Intel Pentium D 3.0 GHz desktop processor. Since I/O on smartphone is several magnitudes slower than desktops, packets cannot be stored on the disk and read back on-demand for wireless relay. For simplicity, an in-memory packet buffer with FIFO replacement policy was used. Disk access during the contact with APs was further limited and data was pushed to the disk only after the contact was over so that the short contact time for data transfer could be utilized.

With regard to handling network coding cost, due to the slow processor, thread scheduling and dynamic assignment of priorities are important. For example, network coding incurs much higher cost on the smartphone than on the desktop as shown in Table 2, shown in FIG. 4. A packet size of 1230 bytes was used (i.e., the packet payload in our testbed implementation to ensure the maximum packet size is still within 1500 bytes (Ethernet MTU)). The evaluation used file sizes of 35, 70, 110 packets, which correspond to minimum, median and maximum file sizes, in the experiments. To minimize the impact of coding cost, during a contact, decoding thread was scheduled at a low priority, which dynamically increased when the contact was finished.

The ability to quickly establish connection to an AP is important. This problem is examined in greater detail in [19, 9]. In the context of smartphones, the problem becomes even harder since the Network Driver Interface Specification (NDIS) does not provide access to many low level parameters to implement the association optimizations proposed in the literature, such as intelligently controlling which channels to scan [29,33,32], selecting between active and passive scanning [27], and adjusting retransmission count, using multiple radios [8].

Windows Mobile provides two ways to initiate connection to a Wi-Fi network programmatically, either through the wireless zero config (WZC) interface or by setting the appropriate NDIS OIDs. The association times using the WZC interfaces were around 3.0 sec, which may be unacceptable in the vehicular network context. Embodiments of the present invention, therefore disable WZC and implement NDIS based association, which yields significantly lower association times. In addition, in one embodiment, a new DHCP client and the DHCP caching mechanism described in [9] may be implemented.

The connection setup procedure of one embodiment is as follows. According to one embodiment, the smartphone can scan for APs every 100 ms. When an AP is discovered, the smartphone can wait for a certain number (e.g., three) of RSSI readings greater than −91 dB before trying to associate. Note that association may not be performed immediately, since an association failure can be expensive. The association procedure can be retried up to some number (e.g., seven) of times with a short delay (e.g., 50 ms) between attempts. The smartphone can then send ICMP ping messages to the AP (with increasing timeouts from 20 ms to 500 ms) to test for successful connection, after which data transfer may begin. The various threshold values used in the scheme discussed herein were chosen empirically. The association time and failures are reported below in Section 7.1.

4. Mobility Prediction Accuracy

Figure 5A:
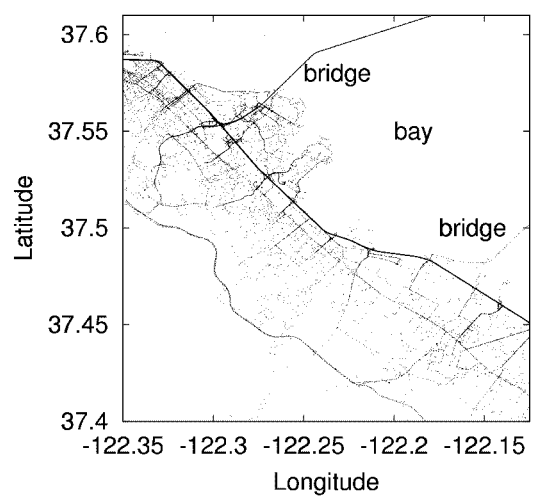
FIGS. 5A-5D provide an illustration of traces for mobility prediction in accordance with an embodiment of the present invention.
Figure 5B:
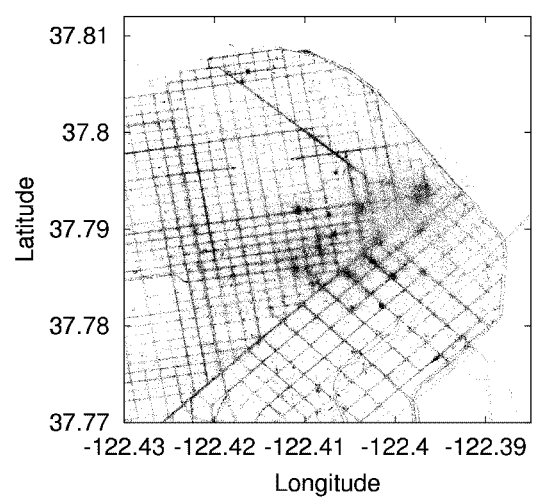

Real vehicular mobility traces were obtained from Cabspotting [10] and Seattle [51]. The former contain over 10 million GPS longitude and latitude coordinates for approximately 500 taxis in the San Francisco Bay Area over the course of 30 days (Dec. 13, 2008—Jan. 13, 2009). The latter contain several week-long traces of city buses in Seattle during 2001. The bus system consisted of over 1200 vehicles covering a 5100 square kilometer area. The GPS coordinates are updated approximately once per minute for both Cabspotting and Seattle traces. FIGS. 5A and 5B illustrate the taxi locations on highways and inside San Francisco, respectively. One can clearly observe the underlying street structure from taxis' GPS. Similar pattern was observed in Seattle traces.

Figure 5C:
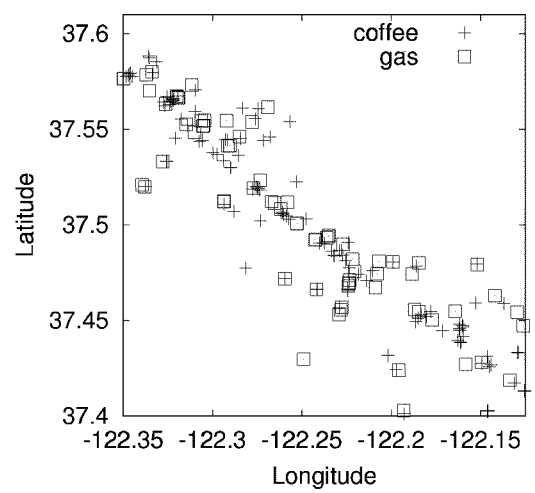
Figure 5D:
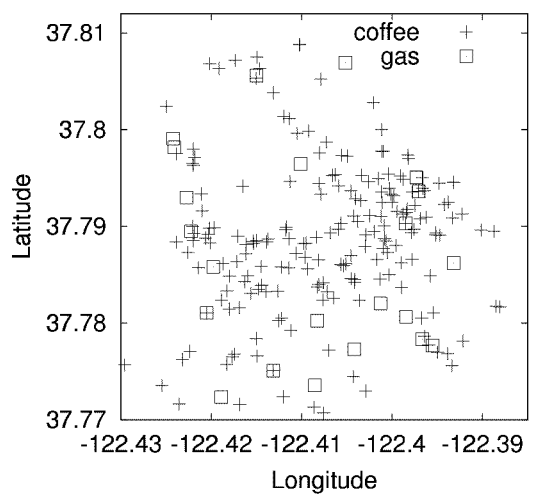

Two sets of locations were considered for placing APs: (i) gas stations and (ii) coffee shops. Yahoo's Local Search API (version 3) [44] was used to obtain the longitude and latitude coordinates of 1120 gas stations and 1620 coffee shops in San Francisco Bay Area, as well as 618 gas stations and 738 coffee shops in Seattle. The average distance between two closest APs in the traces ranges between 345-589 m and the median distance is 157-433 m. There are quite a few APs whose distance exceeds 3500 m in all the four traces. The communication range between an AP and a vehicle was set to either 100 or 200 meters. These values were used because they approximate the communication ranges measured from the vehicular testbeds using 802.11b and 802.11g, respectively. To determine the contact period between a vehicle and an AP, the linear interpolation can be used to obtain the vehicle's mobility trajectory between two adjacent GPS location updates. FIGS. 5C and 5D illustrate the AP locations (coffee shops and gas stations) on the highways and inside San Francisco, respectively. Coffee shops are clearly much denser.

The traces were analyzed and it was found that 23%-40% of time the vehicles were parked or moved within 1 mile/hour, 70% of time they moved less than 11-15 miles/hour, and 90% of time they moved less than 25-27 miles/hour. Since most of the cabs are in the downtown area, they are bounded by the speed limits of the downtown area. The contact duration was studies and was observed that 70% of the contacts between a vehicle and an AP last less than 39-51 seconds when the communication range is 100 meters, and less than 54-82 seconds when the range increases to 200 meters. Such short contacts highlight the importance of replicating data in advance.

For comparison, a variant of the mobility prediction algorithm in [26] was implemented. The algorithm was based on a second-order Markov mobility model. Each state has two sets of coordinates: the vehicle's location at time τ ago, and its current location. In the evaluation discussed herein, τ is either 1, 2 or 3 minutes. Irregular GPS update intervals can be dealt with through linear interpolation. To avoid state space explosion, the algorithm of embodiments described herein discretizes the longitude and latitude coordinates into 0.001°× 0.001° grid squares. The algorithm uses past mobility traces to learn the probability for a vehicle to transition into any new grid square given its last and current grid squares. Based on the transition probabilities, the algorithm identifies the grid square that the vehicle is most likely to visit next, and uses the center of this grid square as the predicted new location for vehicle after time τ. This procedure is repeated to make predictions further into the future. Based on the predicted locations, the algorithm applies linear interpolation to obtain the entire mobility trajectory and then computes the set of APs the vehicle is predicted to visit during a future interval. Following [35,26], the algorithm falls back to a first-order Markov model when the second-order Markov model fails to make a prediction. Finally, the first-order Markov model is included as another baseline algorithm.

The prediction accuracy can be quantified using two metrics: (i) precision, i.e., the fraction of APs predicted by the algorithms of embodiments described herein that are indeed visited by the vehicles in a future interval, and (ii) recall, i.e., the fraction of APs visited by the vehicles in a future interval that are correctly predicted by the algorithms of embodiments described herein. To simplify the comparison of different prediction algorithms, embodiments of the present invention integrate precision and recall can be integrated into a single metric called F-score [40], which is the harmonic mean of precision and recall:

$$F\text{-score} = \frac{2}{1/\text{precision} + 1/\text{recall}}.$$

For all three metrics, larger values indicate higher accuracy.

Two prediction scenarios are considered as associated with the replication optimization algorithms of embodiments described herein: (i) per-interval prediction, which divides time into fixed intervals and the goal is to predict the set of APs that will be visited by a vehicle in the next interval, and (ii) per-contact prediction, i.e., predicting the set of APs that will be visited by a vehicle in an interval immediately following its contact with an AP. Internet replication may use per-interval prediction (see Section 1.2), whereas wireless replication may use both per-interval and per-contact predictions (see Section 1.3). In both scenarios, the prediction interval was set to three minutes, which matches the interval for periodic replication optimization. For each prediction algorithm evaluated, multiple parameter configurations were considered and the configuration that yielded the best F-score was chosen. The results from Cabspotting traces use seven days of training data to predict the mobility in the eighth day, and results from Seattle bus traces use 5 days of training data to predict the sixth day as these traces have shorter duration.

Figure 6A:
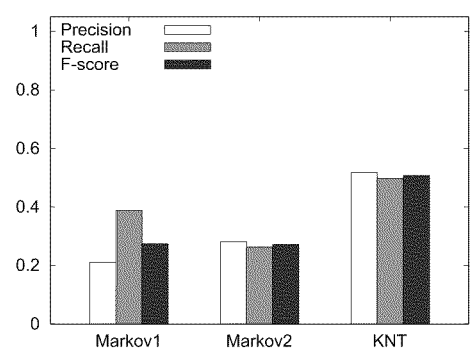
FIGS. 6A-6H provide accuracy comparisons of different mobility prediction algorithms in San Francisco in accordance with embodiments of the present invention.
Figure 6B:
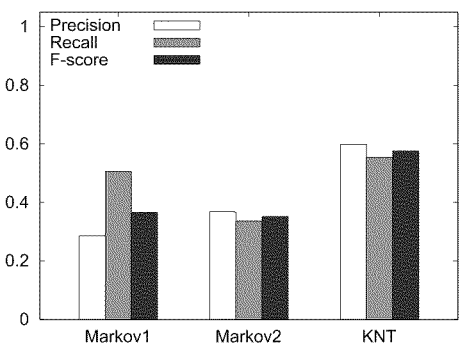
Figure 6C:
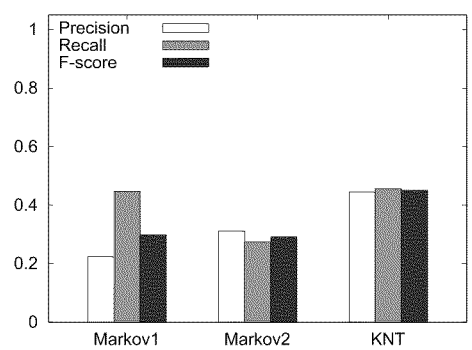
Figure 6D:
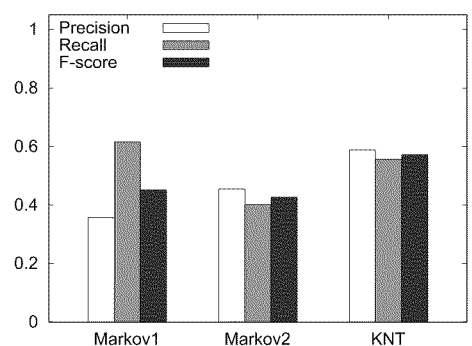
Figure 6E:
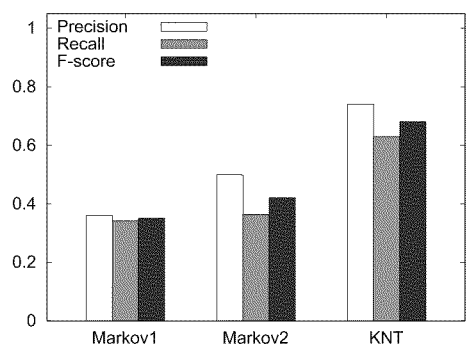
Figure 6F:
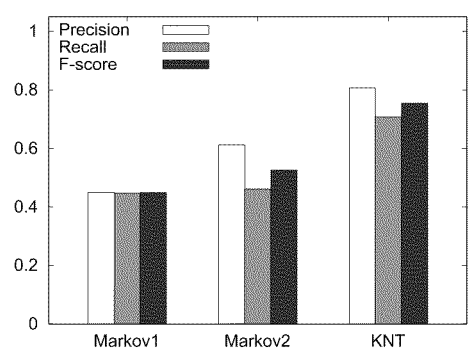
Figure 6G:
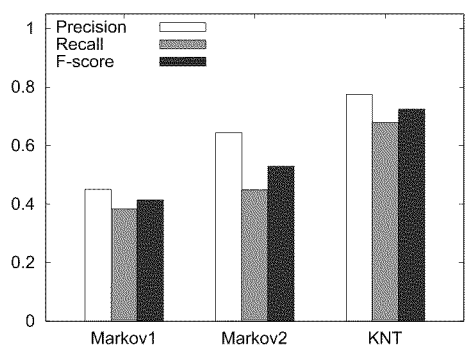
Figure 6H:
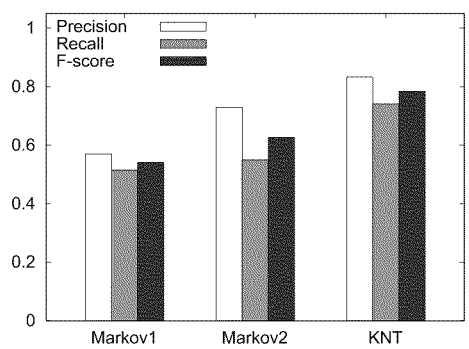
Figure 7A:
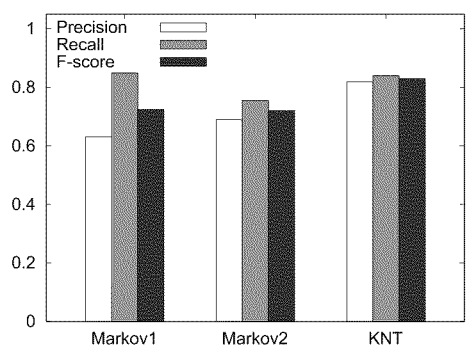
FIGS. 7A-7D provide accuracy comparisons of different mobility prediction algorithms in Seattle in accordance with embodiments of the present invention.
Figure 7B:
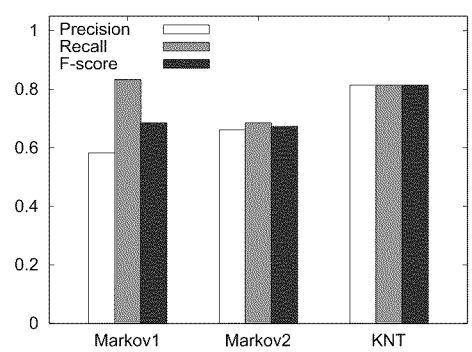
Figure 7C:
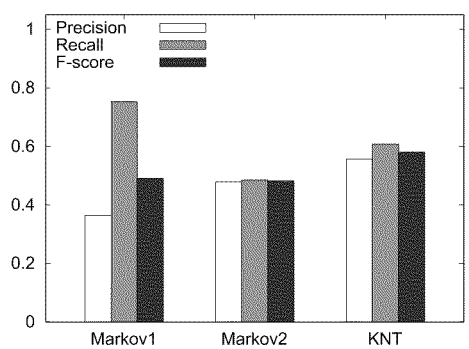
Figure 7D:
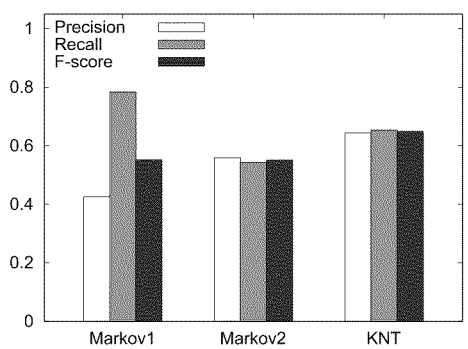

FIGS. 6A-D and 7A-D show the per-interval prediction accuracy when APs are placed at either gas stations or coffee shops and the communication range is either 100 m or 200 m. For the San Francisco taxi mobility trace (FIGS. 6A-D: FIG. 6A, gas stations, range=100 m; FIG. 6B, gas stations, range=200 m; FIG. 6C, coffee shops, range=100 m; FIG. 6D, coffee shops, range=200 m), the KNT algorithm yields F-scores that significantly outperform both first-order Markov model (Markov1) and second-order Markov model (Markov2) by 25-85%. FIGS. 6E-H show the per-contact prediction accuracy (FIG. 6E, gas stations, range=100 m; FIG. 6F, gas stations, range=200 m; FIG. 6G, coffee shops, range=100 m; FIG. 6H, coffee shops, range=200 m). The F-score of the algorithm of embodiments described herein consistently outperforms Markov1 and Markov2 by 14-19%. When APs are located at gas stations, both the precision and the recall of the algorithm of embodiments described herein is above 80%. In general, the prediction accuracy for all three algorithms is higher when gas stations are used to place the APs. This is because the density of gas stations is much lower than coffee shops (see FIG. 5D), thus introducing less ambiguity for prediction. In addition, per-contact prediction tends to have higher accuracy than per-interval prediction, since the latter requires predicting farther into the future (as the next interval may not immediately start after the current time). For the Seattle bus mobility trace (FIGS. 7A-D: FIG. 7A, gas stations, range=100 m; FIG. 7B, gas stations, range=200 m; FIG. 7C, coffee shops, range=100 m; FIG. 7D, coffee shops, range=200 m)), the KNT algorithm outperforms Markov1 and Markov2 by 25-94% in terms of F-scores. In general, the absolute prediction accuracy for all three algorithms is higher for the bus mobility trace, because buses tend to follow fixed routes and are thus more predictable.

Finally, it is worth noting that in contrast to findings in [35,26], Markov2 does not outperform Markov1 in the evaluation described herein. This is not surprising, because with much higher speed and less frequent GPS location updates, mobility prediction is more challenging in vehicular networks. As a result, solutions that perform better in a less mobile environment do not necessarily perform better in vehicular networks.

The above results clearly show that the KNT mobility prediction algorithm consistently achieves good accuracy in vehicular networks. Later in Section 5, it will be shown that optimization based on these prediction results yields good performance in practice.

5. Trace-Driven Simulation 5.1 Simulation Methodology

One goal of the evaluation described herein is to answer the following questions: (i) Can VCD support high bandwidth services to moving vehicles? (ii) What benefit does VCD obtain from each individual technique in VCD (i.e., wireline replication, wireless replication vs. epidemic replication)? (iii) How do network parameters, such as traffic demands, communication range, AP density, number of cars, and/or the like affect each scheme?

To achieve this goal, a trace-driven simulator was developed for evaluation as follows. First, the contact traces were generated based on the mobility traces, AP locations, and wireless communication range. When multiple vehicles contact an AP at the same time, the original contacts are divided into non-overlapping contacts, each of which has only one vehicle in contact with an AP. Such contact partitions can be easily realized in practice by letting the AP serve the new vehicle only after it finishes serving the previous one. Similarly, when a vehicle is within the communication range of multiple APs, the contact is also partitioned into multiple non-overlapping intervals, each of which involves one AP. Another way to partition a contact between multiple vehicles and an AP or between multiple APs and a vehicle is to equally divide the contact time among multiple vehicles or multiple APs that are involved in the contact to mimic round-robin scheduling. The performance of these two types of partitions is similar, and the first partition was used in the evaluation.

The actual contact traces (after the above post processing), predicted contacts, and traffic demands were then fed to the simulator. The simulator updates the content at APs and vehicles based on the actual contacts, traffic demands, replication schemes, and wireless and wireline capacity at APs. Network coding was implemented for all data transfer to ensure only innovative packets (i.e., whose coding coefficients are linearly independent) are exchanged between APs and vehicles or among APs. A content server on the Internet, which has all the content, was used; whereas, all APs and vehicles were initialized with no content.

The simulator was used to compare the following algorithms: (i) no replication, (ii) wireline replication alone, (iii) vehicular replication alone, (iv) both wireline and vehicular replication, and (v) wireline, vehicular, and mesh replication (VCD). In all the schemes, a vehicle will download content remotely from the Internet, if the content is not available locally at an AP or mesh network, provided the current AP has Internet connectivity. To further understand the benefit of each component in VCD design, each technique in VCD was also systematically turned off.

To study the impact of traffic demands, traffic demands were generated following either uniform distribution or Zipf-like distribution. In both cases, every interval or vehicle randomly selects a specified number of files to request. In the uniform distribution, a file is uniformly drawn from the pool of the files that the user has not requested. In Zipf-like distribution, the probability of requesting the ith file is proportional to $$\frac{1}{i^\alpha},$$

where i is the popularity ranking of the file and i=1 indicates the most popular file. In the evaluation, α=0.4 was used so that a similar traffic load can be generated using both Zipf-like and uniform distributions and the performance difference is solely due to the difference in the distribution. Zipf-like distribution was used as the default setting, since a number of studies show that realistic user demands often exhibit Zipf-like distributions [7,14].

For delay sensitive applications, such as video, their performance depends on the amount of data received before the deadline. Therefore, the average throughput per vehicle was used as the performance metric, which denotes the total demand that is satisfied before the deadline divided by the product of the number of vehicles and the entire trace duration (including the time without contacts with APs). The deadline is set to the end of the interval in which the demand is generated.

The evaluation used a 2-hour trace, which exhibits similar contact characteristics as in the 1-day trace, shown in Section 4. Other default settings used in the evaluation described herein include: 100-meter communication range between APs and vehicles, 500-meter communication range among APs (well within reach by many mesh routers [54, 55]), Zipf-like traffic demands, placing APs at coffee shops, all APs having 22 Mbps wireless link, half of the APs having Internet links with 2 Mbps while the other half have no Internet connection. The content server has a 1 Gps Internet link and zero wireless capacity to indicate that it is not directly reachable by vehicles. There are 1200 files in total. Each user requests 20 files every 3-minute interval, each file has 2K packets, and each packet is 1000 bytes. Every file represents either a video clip or one chunk in a larger video file (e.g., a large video file were divided into smaller chunks and random linear combinations of packets were generated within each chunk for efficient replication). The effects of changing these parameters were further evaluated.

5.2 Simulation Results

Figure 8A:
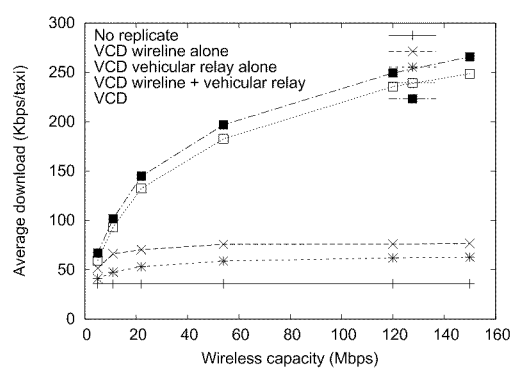
FIGS. 8A-8D plot the average throughput of 50 vehicles under varying wireless capacity and Zipf-like traffic conditions in accordance with embodiments of the present invention.
Figure 8B:
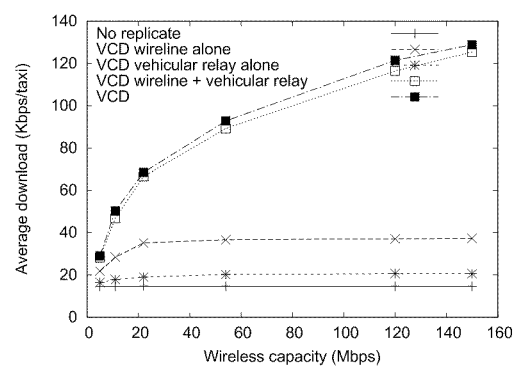
Figure 8C:
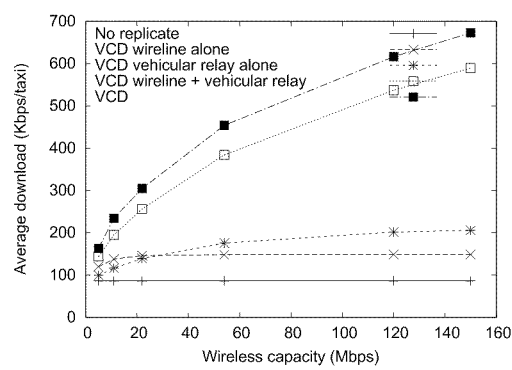
Figure 8D:
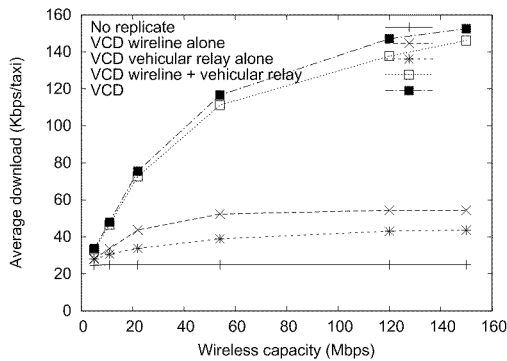

FIG. 8A-D are graphs plotting the total downloaded content as wireless bandwidth is varied from 5, 11, 22, 54, 120, and 150 Mbps (FIG. 8A, San Francisco, coffee shops, range=100 m; FIG. 8B, San Francisco, gas stations, range=100 m; FIG. 8C, San Francisco, coffee shops, range=200 m; FIG. 8D, Seattle, coffee shops, range=100 m). The following observations can be made. First, in all cases VCD significantly out-performs the other schemes and its benefit increases rapidly with wireless capacity. Second, as one would expect, no replication performs the worst. Interestingly, its performance remains the same as wireless capacity is increased. This is because without replication APs often do not have content locally and the wireless download is bottlenecked by slow Internet access capacity. This further demonstrates the need of replication. Third, the performance of both wireline and vehicular replication alone initially improves with increasing wireless capacity and then tapers off. This is because limited Internet capacity prevents fully taking advantage of large wireless capacity. In comparison, harnessing both wireline and vehicular replication opportunities can effectively utilize the large wireless capacity when available. Adding mesh replication further increases average throughput by 14-20% under high AP density (FIG. 8C), and by 3-13% in low AP density. The benefit of mesh replication can be increased further if APs use high gain antennas or MIMO. Overall, at 22 Mbps Wi-Fi capacity, VCD achieves 70-300 Kbps average throughput per vehicle depending on the AP density, which can support video streaming applications.

Figure 9A:
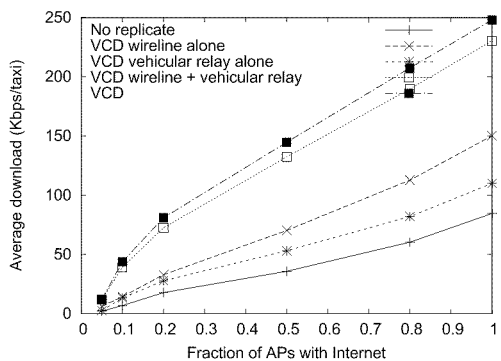
FIGS. 9A-9B plot the average throughput under varying fraction of APs with Internet in accordance with an embodiment of the present invention.
Figure 9B:
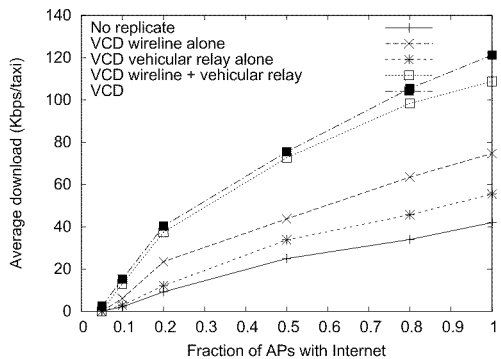

Next, the fraction of APs with Internet connectivity was varied. FIGS. 9A (San Francisco) and 9B (Seattle) plot the average throughput under varying fraction of APs with Internet (Zipf-like traffic, APs at coffee shops, range=100 and 50 vehicles). As one can see, VCD continues to significantly out-perform the other schemes. Its performance is 2.4-3.8 times that of no replication, 1.1-1.7 times that of optimized wireline replication, and 1.8-2.3 times that of epidemic replication. In addition, all the replication schemes significantly out-perform no replication. Their benefits increase with the fraction of APs having Internet. The rate of such increase is faster for VCD and wireline replication scheme than epidemic replication, since they proactively take advantage of wireline capacity to push data.

Figure 10A:
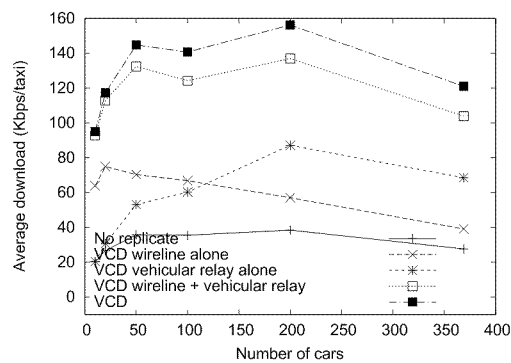
FIGS. 10A-10B plot the average throughput under a varying number of vehicles in San Francisco in accordance with an embodiment of the present invention.
Figure 10B:
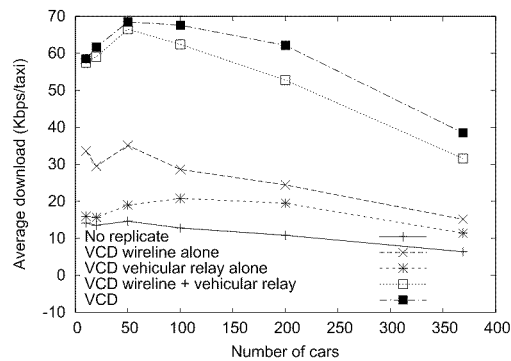

To further evaluate the impact of degree of deployment, the number of vehicles was varied by randomly selecting a subset of vehicles from the traces. FIGS. 10A (coffee shops) and 10B (gas stations) summarize the performance results (San Francisco, Zipf-like traffic and range=100 m). The following can be made. First, VCD continues to perform the best in all cases. Second, increasing the number of vehicles initially improves the average throughput because more content are available locally at APs due to previous requests coming from other users. In addition, increasing the number of vehicles also creates more wireless relay opportunities. However, a further increase degrades performance due to increased contention for limited wireline and wireless resources. Third, the benefit of mesh replication increases with the number of vehicles. When all the vehicles in the two-hour traces are used, mesh replication helps to increase throughput by 17-22%. This is because increasing the number of vehicles increases vehicular relay opportunities and makes it more likely to have content available at nearby mesh nodes.

Figure 11A:
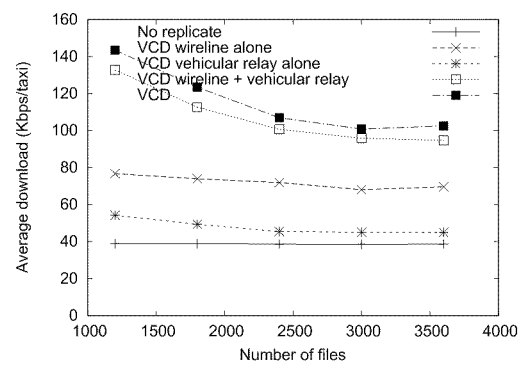
FIGS. 11A-11B plot the average throughput under uniform traffic demand in San Francisco in accordance with an embodiment of the present invention.
Figure 11B:
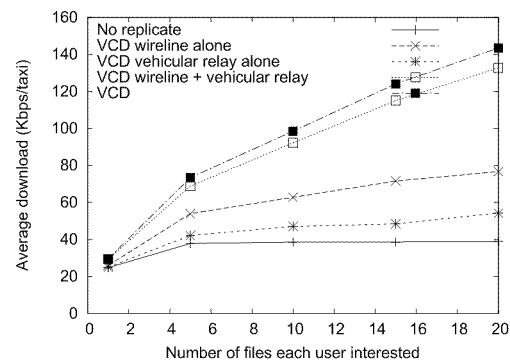
Figure 12A:
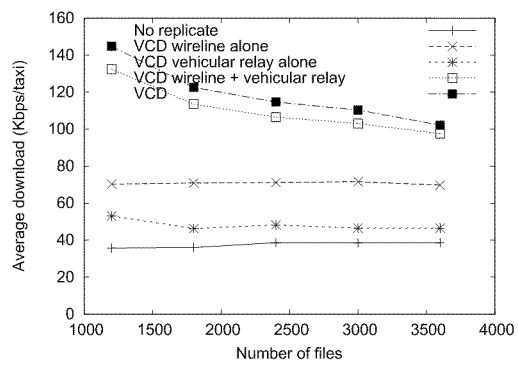
FIGS. 12A-12B plot the average throughput under Zipf-like distributed traffic demand in San Francisco in accordance with an embodiment of the present invention.
Figure 12B:
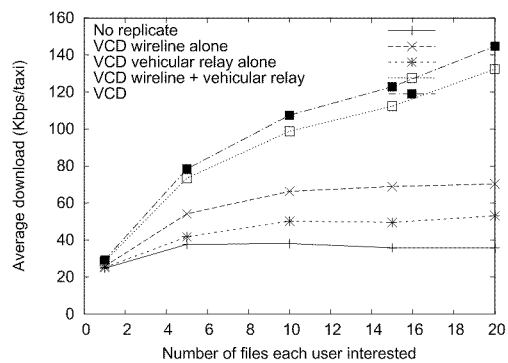

FIGS. 11A (vary number of files) and 11B (vary number of files per user) show the performance for uniform demand, and FIGS. 12A (vary number of files) and 12B (vary number of files per user) show the performance for Zipf-like, distributed traffic demand, all in San Francisco, coffee shops, 50 vehicles and range=100 m. As before, VCD performs the best in all cases. The performance of uniform and Zipf-like distributed traffic receives similar performance. Moreover, decreasing the total number of files tends to improve performance as demands are more concentrated and less replication is required to satisfy them. Finally, the replication benefit tends to increase with an increasing number of files requested by each user. This is because when a user is interested in more content, it is more likely to have some locally available content that satisfies the user.

Finally, inter-flow coding gain in VCD was examined. Table 3, shown in FIG. 13 shows the ratio between total downloaded traffic in VCD with and without inter-flow coding. One can observe that the inter-flow coding benefits the most under a moderate number of cars. This is because when there are few cars, the likelihood of two cars meeting the same AP during an interval is low, limiting the inter-flow coding opportunity. Increasing the number of cars increases the total network capacity by creating more relay opportunities. As the network becomes less congested, the value of inter-flow coding reduces since traffic may be sent out even without inter-flow coding.

6. Trace-Driven Emulation

The objective of the Emulab results described herein is twofold: (1) validate simulator results, and (2) evaluate the performance of VCD at scale, which is hard to do in testbed experiments.

6.1 Validation

In Section 5, trace-driven simulation results were presented to compare various replication strategies under a variety of parameter settings. In order to validate the simulator results, they were compared against those obtained from Emulab under identical settings. The 30 most interactive APs from the trace contacting 100 vehicles were then considered. The radio range was 200 m. Given limited machine availability on Emulab, multiple APs and vehicles were emulated on each machine. This limits the link capacity that can be selected per-AP or per-Vehicle. Hence, 1 Mbps and 6 Mbps were used as the Internet and wireless link capacities, respectively, for the following results.

Figure 14A:
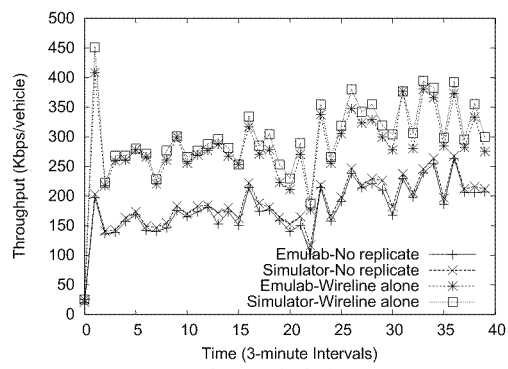
FIGS. 14A-14B illustrate the average throughput for each interval in Emulab and simulator for all AP's having Internet connectivity and 10% AP's having Internet connectivity, respectively.
Figure 14B:
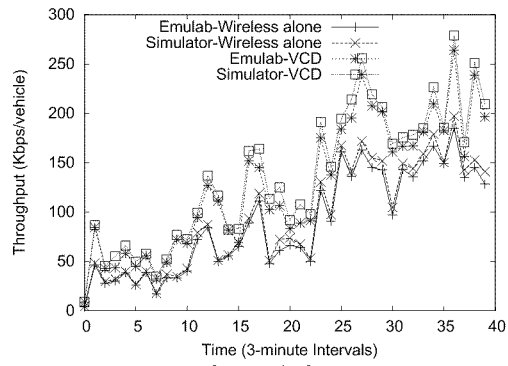

FIGS. 14A and 14B show the average throughput for each interval in Emulab and simulator. In FIG. 14A, all APs are considered to have Internet connectivity and the simulation and emulation performance are compared under no replication and wireline replication alone. As shown, the simulator results closely follow that of Emulab and the discrepancy between them is below 10%. In FIG. 14B, only 10% of the APs are considered to have Internet connectivity and the performance for wireless replication alone and VCD are compared in both simulator and Emulab. In this case, since most APs are not connected to the Internet and there is no mesh connectivity, most content is replicated via wireless. As shown in FIG. 14B, the simulator results match well with the Emulab results, with below 10% difference for both wireless replication and VCD.

6.2 Micro-Benchmarks.

The following micro-benchmark results show that the implementation of embodiments described herein is efficient and light-weight even when operating at scale. The 120 most interactive APs and 317 vehicles from the trace were emulated.

Table 4, shown in FIG. 15, shows the average per-interval control message overhead imposed by the system of embodiments of the present invention. One can observe that control messages constitute only 0.054% of the total wireline traffic exchanged amongst APs and between APs and the controller, and constitute only 1.6% of the total wireless traffic between APs and vehicles.

It may be beneficial to ensure that the centralized controller does not become the performance bottleneck. On a 2.133 GHz Xeon machine with 3 GB RAM, average CPU and memory utilization for the controller is 2% and 38 MB respectively. The average total latency at the controller is 7.8 s, which is a small fraction of the three min interval. Out of the 7.8 s, the LP computation takes 6.5 s. Table 5, shown in FIG. 16, further shows the breakdown of the processing latency at the controller. The preprocessing stage involves predicting which APs will be visited and preparing input file for lp_solve. The LP computation was performed on Emulab using lp_solve [49] due to licensing issues with cplex [50], and the time can be further reduced if cplex is used instead.

Figure 17A:
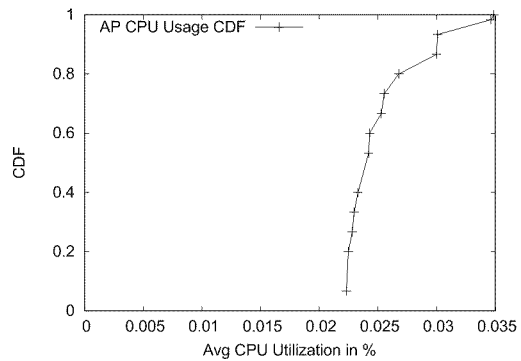
FIGS. 17A-17B present the CDF of the average CPU and memory usage, respectively, at all AP's in accordance with an embodiment described herein.
Figure 17B:
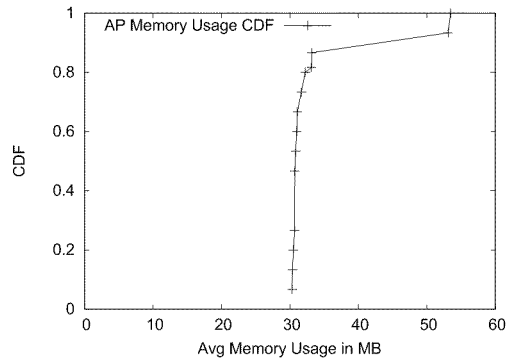

The AP implementation of embodiments described herein may be lightweight and run comfortably on the modest CPU and memory resources available on commercial AP devices. 120 instances of the AP were run on 2.133 GHz Xeon machines with 3 GB RAM. FIG. 17A shows the CDFs of average CPU at all APs, and FIG. 17B shows the average memory utilization at all APs. It can be seen that all APs have roughly the same usage and, on average each AP instance consumes only 0.01% CPU load and 33 MB of memory and hence is light-weight.

7. Testbed experiments

The present invention was evaluated using two testbeds to understand its feasibility and effectiveness under realistic wireless conditions. The first testbed consists of 9 APs deployed in office buildings near the road. The APs are Linux desktops equipped with 802.11b radios, which are set to a fixed data rate of 11 Mbps. The second testbed consists of 4 APs deployed outdoor equipped with 802.11n radios that use autorate. 802.11n radios use 2.4 GHz frequency with a 20 MHz band. In both testbeds, the APs have 1 Mbps wireline access link connecting to the back-end content server. In the 802.11b testbed, 3 out of the 9 APs forms a mesh network as a 2-hop linear chain, whereas the 4 APs in the 802.11n testbed forms a mesh network with pairwise connectivity. In both testbeds, mesh communication takes place using additional 802.11b radios. The clients were implemented on both Windows Mobile Smartphones and Windows XP Laptops. Smartphone clients are used in 802.11b experiments and laptop clients are used in 802.11n experiments. Both clients ran a video streaming application during the car ride. The cars traveled around the testbed at 15 mph (speed limit). It is expected that the driving speed does not significantly affect the performance when association time is small, because increasing speed reduces both on-time (i.e., contact time) and off-time (i.e., the time between two consecutive contacts).

7.1 Connection Setup

Due to deployment constraints, the AP placement of the testbed was not ideal: four of the APs were placed at 3rd floor of buildings, limiting their range; and three APs were placed in high AP density areas, with 50-70 APs within their range, causing heavy to interference. This deployment stress-tests the system of embodiments described herein. In the experiments described herein during car rides, 65.2% out of all attempts were successfully associated. Most of the failures came from the 3 APs deployed in the high AP density area: association success percentage was only 33.3% for these APs. In fact, even the Windows Mobile Wi-Fi manager utility experienced problems such as very long connection time and adapter freezing near these APs even without any movement. The other access points can successfully associate for 85.7% of the time. The association time in the experiments has minimum, median and maximum of 36 ms, 844 ms, and 14867 ms, respectively. 70% of the associations finish within 2 seconds. Associations were retried up to 7 times and the median retry count is 1. In the 802.11n outdoor testbed, association success rate was 89.58% out of 48 attempts. The minimum, median and maximum association times were 48 ms, 162 ms, and 4086 ms, respectively. 80% of the associations finish within 246 ms and the median retry count was 1. The better results for 802.11n testbed were because (i) laptops were used as clients, (ii) APs were placed outdoor closer to vehicles, and (iii) MIMO in 802.11n improves received signal strength. These numbers suggest that the implementation of embodiments described herein is practical, especially given the limited low level control available and limited choices in placing the APs. With better AP locations, the performance would further improve.

7.2 Wireline and Mesh Replication

A video streaming application was implemented that can play H.264 videos encoded at 64 kbps, downloaded from APs. Video content was divided into multiple files and intra-flow network coding was used to generate random linear combination of packets within a file. Once enough packets were received for the file, the file was decoded and passed to the video player on the smartphone to play in proper order using the Windows Mobile media player plugin.

Tables 6 (FIGS. 18) and 7 (FIG. 19) compare the performance of the optimized wireline and mesh replication with no replication and full replication at all the APs in 802.11b and 802.11n testbeds, respectively. Two performance metrics are considered: total download size and total amount of time the video can play (which is proportional to the download size). The averages are reported over 3 runs. The full replication assumes every AP has all the files and serves as an upper bound. In both experiments, the planned trajectory was followed, which was fed as input to the controller. In 802.11b testbed, wireline replication alone and wireline plus mesh replication performs 2.45× and 2.7× that of no replication, respectively. In 802.11n testbed, the throughput of wireline and wireline plus mesh replication is 7.3× and 7.8× that of no replication, respectively. This demonstrates the effectiveness of replication. Moreover, the benefit increases with wireless capacity. There is a gap between the performance of VCD and full replication, since the Internet bottleneck prevents complete replication of all the required files.

Next, inter-flow coding was examined using the following scenario. Both car 1 and car 2 need files 1-30. AP 1 has files 1-15, and AP 2 has files 16-30. Car 1 visits AP 1 and downloads files 1-15; and car 2 visits AP 2 and downloads files 16-30. Both of them, try to download the remaining files from AP 0. The Internet capacity was limited to 5 Kbps to create an Internet bottleneck. While 5 Kbps seems low as an Internet capacity, this is still realistic and corresponds to the cases where the Internet link is shared between multiple cars and each car only gets a small portion of Internet capacity for replicating content on its behalf. In the intra-flow based replication, only car 2's files are transferred in time to AP 0. Car 1 is forced to fall back to Internet fetch during its contact with AP 1. In comparison, the inter coding xors the intra-coded packets generated from files 1-15 and from files 16-30, and the xor-ed packets can all be replicated to AP 1 in time. FIG. 22B shows that the packet rate achieved by car 1 and 2 under inter-flow based replication is almost doubled.

7.3 Vehicular Replication Relay

To show the benefit of vehicular replication, the following setup was used. Car 1 follows the route AP1-AP2, and Car 2 follows the route AP2-AP1. Car 1 possesses files 1-20 and is interested in files 21-40, while car 2 has files 21-40 and is interested in files 1-20. Both AP1 and AP2 lack Internet and mesh connectivity. Therefore, without vehicular replication, neither car can get the content it is interested in and the total throughput is 0 under no replication, wireline replication alone, and mesh replication alone.

In comparison, VCD exploits the vehicular replication opportunity. When car 1 meets AP1, VCD finds that files 1-20 have highest utility because it predicts car 2 will visit AP1 soon and need these files. So AP1 instructs the car to upload them first. Similarly, car 2 uploads file 21-40 at AP2. When car 1 reaches AP2 it can download these files. Similarly, car 2 can download files 1-20 from AP1, leading to much higher throughput. Table 8 (FIG. 20) shows that both cars download their interested files in the actual road experiments.

8 Related Work

Related works can be classified into three areas: (i) vehicular networks, (ii) disruption tolerant networks (DTNs), and (iii) mobility and demand prediction.

With respect to the first area, a variety of novel techniques have been proposed to optimize various aspects of communications in vehicular networks. For example, CarTel project [13] proposes architectures for vehicular sensor networks, and develops a series of techniques to optimize association, scanning, data transport protocols, and rate selection. ViFi [5] proposes to take advantage of multiple nearby APs to improve communication with passing vehicles. [11] conducts in-depth study of various rate adaptation schemes in vehicular networks and proposes to select data rate based on a combination of RSSI and channel coherence time. [25] uses directional antennas to maximize the transfer opportunity between the vehicle and the AP. These works are complementary to the work described herein in that they focus on optimizing one-hop communication between a vehicle and nearby APs, while embodiments of the present invention focus on end-to-end performance. Therefore, these approaches can potentially be leveraged to improve the performance of the last hop. With these enhancements, the gap between Internet and wireless capacity will further increase and make replication even more important. Recent proposals also include changing applications to cope with vehicular network, such as Thedu [4], which transforms interactive Web search into one-shot request/response process to reduce access delay. While Thedu still requires connecting with the remote server, content can be replicated to APs to eliminate the Internet bottleneck. The third class of work studies protocol issues. [48] proposes fast connection establishment, scripted handoffs, and prefetching at APs using HTTP range requests. Finally, there are a few works on vehicle-to-vehicle communication. For example, SPAWN[56] uses gossip for file transfer and CarTorrent [57] extends SPAWN and is implemented in a testbed. [47] treats vehicular networks as a special type of DTNs and focuses on leveraging vehicle to vehicle (V2V) communication to deliver content. As mentioned earlier, using the analysis in [53], APs are leveraged as the rendezvous points for to replicating content among vehicles. Optimizing content replication given limited wireline and wireless resources has not been studied earlier.

With respect to the second area, vehicular networks can also be considered as a special type of disruption tolerant networks (DTNs) and benefit from advances in this area. Different from traditional DTNs, which focus on communicating with a specific node, embodiments of the present invention focus on content delivery. Epidemic routing [38] was proposed for DTNs—whenever two nodes meet, they exchange all messages that the other does not have. Recently, utility-based replication was proposed, where nodes replicate data over the best contacts according to some utility (e.g., mobility history [21] or delay [3]). For example, RAPID [3] explicitly tries to optimize system-wide metrics such as average delay while incorporating resource constraints. Embodiments described herein leverage both utility based optimization and epidemic replication to achieve efficiency and robustness.

Finally, with respect to the third area; there is a large body of literature on mobility prediction, ranging from coarse-grained prediction in cellular networks (e.g., [22,2,1,30,23]) to more fine-grained prediction in Wi-Fi networks (e.g., [34, 26]). In particular, [35] compares various predictors in literature and suggests that 2nd order Markov with a simple fall-back mechanism (when there is no prediction) performs well. [17] builds mobility profiles for users and statistically predicts the next social hub the user will visit. [26] builds the user's customized mobility models on the devices themselves, and uses a second order Markov model to predict the connection opportunity and its quality of the device with an AP. [24] uses the past history to identify opportunities for media sharing in ad hoc DTNs. These works focus on low speed (e.g., personal mobility). Vehicles travel much faster and create new challenges for mobility prediction, which are addressed by embodiments of the present invention.

9 Controller

Figure 21:
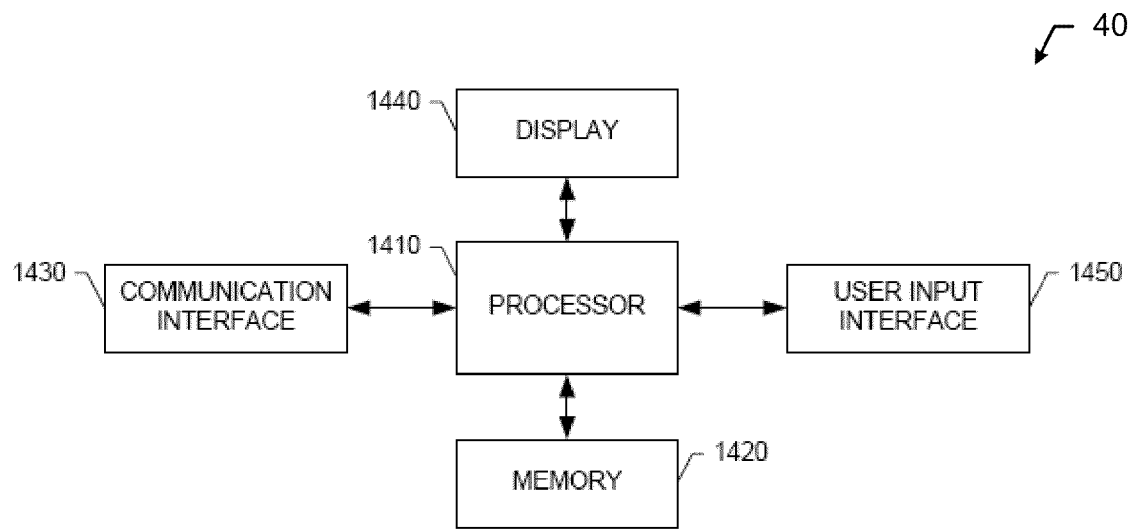
FIG. 21 is a block diagram of an entity capable of operating as the controller of embodiments described herein.

Referring now to FIG. 21, a block diagram of an entity capable of operating as a Controller 40 is shown in accordance with one embodiment of the present invention. The entity capable of operating as a Controller 40 includes various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as a Controller 40 can generally include means, such as a processor 410 for performing or controlling the various functions of the entity.

In one embodiment, the processor is in communication with or includes memory 420, such as volatile and/or non-volatile memory that stores content, data or the like. For example, the memory 420 may store content transmitted from, and/or received by, the entity. Also for example, the memory 420 may store software applications, instructions or the like for the processor to perform steps associated with operation of the entity in accordance with embodiments of the present invention.

In addition to the memory 420, the processor 410 can also be connected to at least one interface or other means for displaying, transmitting and/or receiving data, content or the like. In this regard, the interface(s) can include at least one communication interface 430 or other means for transmitting and/or receiving data, content or the like, as well as at least one user interface that can include a display 440 and/or a user input interface 450. The user input interface, in turn, can comprise any of a number of devices allowing the entity to receive data from a user, such as a keypad, a touch display, a joystick or other input device.

Figure 22:
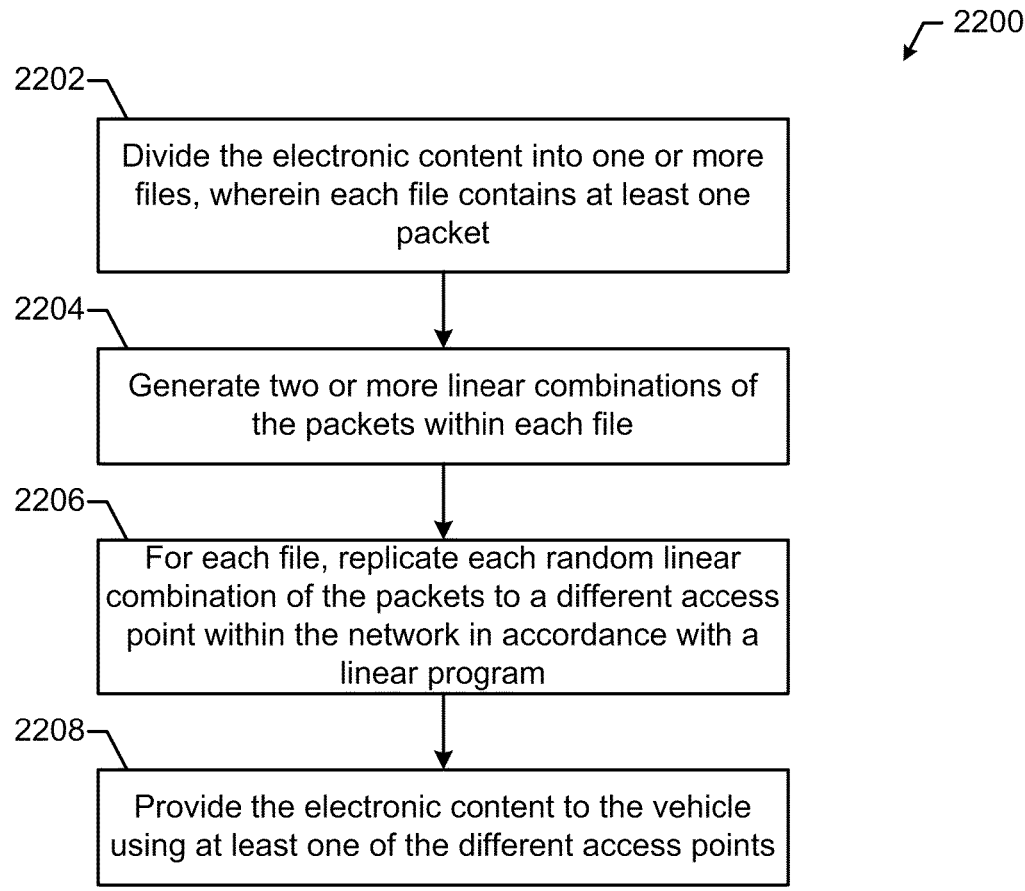
FIG. 22 is a flow chart illustrating a method for providing an electronic content to a vehicle from two or more access points within a network using a controller in accordance with the embodiments described herein.

Now referring to FIG. 22, a flow chart illustrating a method 2200 for providing an electronic content to a vehicle from one or more access points within a network using a controller is shown. The controller divides the electronic content into one or more files wherein each file contains at least one packet in block 2202, and generates two or more random linear combinations of the packets within each file in block 2204. For each file, each random linear combination of the packets is replicated to a different access point within the network in accordance with a linear program in block 2206. Thereafter, the electronic content is provided to the vehicle using at least one of the different access points in block 2208. The vehicle can be a scooter, a motorcycle, a car, a truck, a boat, a non-motorized vehicle or any other know mode of transportation. The electronic content can be provided to an electronic device within the vehicle, such as a computer, a communications device, a smartphone, a personal data assistant, an entertainment device, an information center, a combination thereof, or any other known device in which it is desirable to access or download electronic content. The electronic content can be any form of analog or digital information that can be transmitted wirelessly (e.g., data, video, audio, mixed-media, etc.).

As previously described in detail, the linear program can use the equations shown in FIG. 2. Moreover, the different access points can be determined based on a mobility prediction algorithm. In addition, the electronic content can be provided to the vehicle by associating the vehicle with one of the different access points, providing a list of the files received and a list of the files requested from the vehicle to the associated access point, and downloading one or more files from the associated access point until the download is complete or the vehicle is no longer associated. The downloaded files are: (i) within the list of the files requested, (ii) not within the list of the requested files, or (iii) not available at the associated access point until the associated access point obtains the unavailable files from an external source.

Furthermore, the vehicle can transfer one or more files from a first access point to a second access point, such that the linear program uses the equations shown in FIG. 2 as modified by Equations (2) and (3). The network can be a mesh network in which case, the linear program uses the equations shown in FIG. 2 as modified by the equations in paragraph [0044]. Moreover, files can be uploaded from the vehicle to one of the access points as part of the replication process, such that the linear program uses the equations shown in FIG. 2 as modified by the equations in paragraph [0050]. Finally, the files can be replicated using inter-flow network coding.

Figure 23:
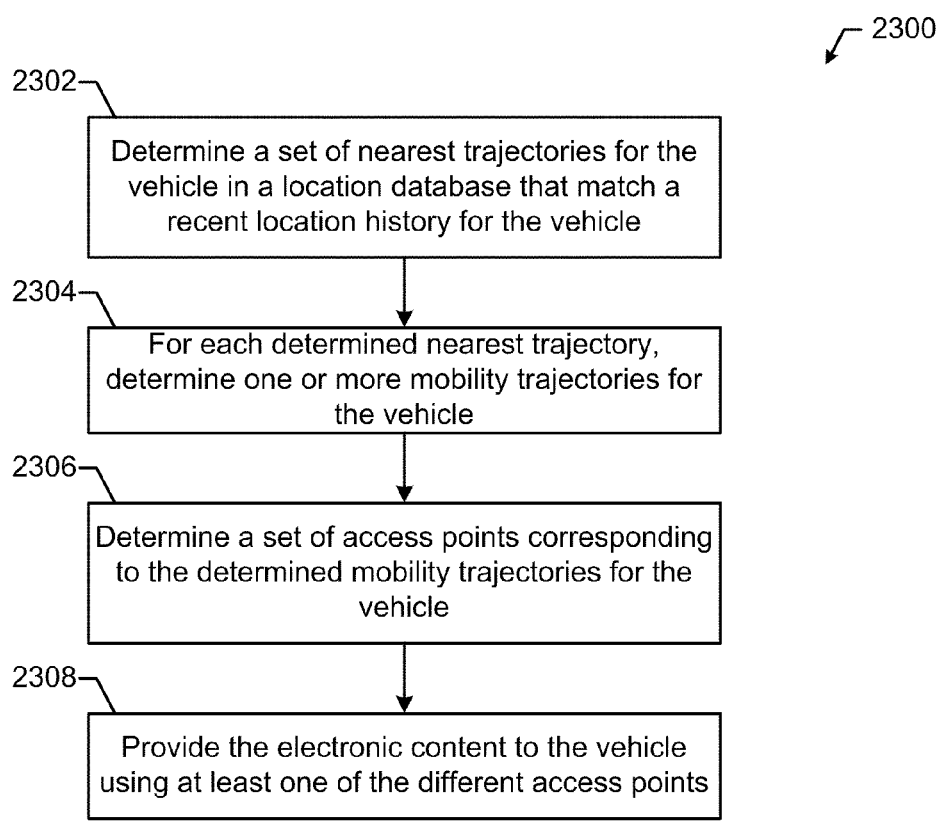
FIG. 23 is a flow chart illustrating a method for providing electronic content to a vehicle using a network of access points using a controller in accordance with the embodiments described herein.

Referring now to FIG. 23, a flow chart illustrating a method 2300 for providing electronic content to a vehicle using a network of access points is shown. The controller determines a set of nearest trajectories for the vehicle in a location database that match a recent location history for the vehicle in block 2302. For each determined nearest trajectory, one or more mobility trajectories are determined for the vehicle in block 2304, and a set of access points are determined that correspond to the determined mobility trajectories for the vehicle in block 2306. Thereafter, the electronic content is provided to the vehicle using at least one of the determined set of access points in block 2308. As previously described, the location database can be a GPS location database, and the recent location history can be a set of GPS coordinates received from the vehicle over a specified time period. The GPS coordinates can also be converted to an indexed grid square.

Methods 2200, 2300, as well as the other processes described herein, can be implemented using a computer program embodied on a computer readable storage medium. The computer program when executed by a processor causes the processor to perform the relevant steps. For example, with respect to FIG. 21, the processor 1410 can execute the program stored in memory 1420 to perform the processes described herein.

10 Conclusion

The foregoing presented the VCD system of embodiments of the present invention that can provide high-bandwidth content access to vehicular passengers by utilizing opportunistic connections to Wi-Fi access points along the road. According to one embodiment, VCD can predict which APs a vehicle will encounter in the future and pro-actively pushes content to these APs by leveraging both wireline and wireless connectivity. The VCD system of embodiments described herein was evaluated using trace-driven simulation and Emulab-based emulation. The results show that VCD is capable of downloading 3-6 times as much content as no-replication, and 2-4 times as much content as wireline or vehicular replication alone. The benefit further increases as the ratio between wireless and wireline capacity increases. A full-fledged prototype of VCD was developed using two testbeds: a 9-AP 802.11b testbed and a 4-AP 802.11n testbed. The experience suggests that VCD is a promising approach to enable high-bandwidth content distribution in vehicular networks.

As described above and as will be appreciated by one skilled in the art, embodiments of the present invention may be configured as a system, method and device (e.g., controller). Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as processor 410 discussed above with reference to FIG. 17, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., processor 410 of FIG. 17) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

REFERENCES

The following references are hereby incorporated herein by reference in their entirety:
1 I. F. Akyildiz and W. Wang. The predictive user mobility profile framework for wireless multimedia networks. *IEEE/ACM Trans. Netw.*, 12(6):1021-1035, 2004.
2 A. R. Aljadhai and T. Znati. Predictive mobility support for qoS provisioning in mobile wireless environments. *IEEE Journal on Selected Areas in Communications*, 19(10): 1915-1930, 2001.
3 A. Balasubramanian, B. Levine, and A. Venkataramani. DTN routing as a resource allocation problem. In *Proc. of SIGCOMM*, pages 373-384, 2007.

4 A. Balasubramanian, B. Levine, and A. Venkataramani. Enhancing interactive web applications in hybrid networks. In *Proc. of MobiCom*, September 2008.

5 A. Balasubramanian, R. Mahajan, A. Venkataramani, B. Levine, and J. Zahorjan. Interactive WiFi connectivity for moving vehicles. In *Proc. of SIGCOMM*, 2008.

6 BMW car2car communication development. http://www.motorauthority.com/bmw-enlists-in-car-2-car-communications-development.html.

7 L. Breslau, P. Cao, L. Fan, G. Philips, and S. Shenker. Web caching and Zipf-like distributions: evidence and implications. In *Proc. of IEEE INFOCOM*, March 1999.

8 V. Brik, A. Mishra, and S. Banerjee. Eliminating handoff latencies in 802.11 WLANs using multiple radios: Applications, experience, and evaluation. In *Proc. of IMC*, October 2005.

9 V. Bychkovsky, B. Hull, A. Miu, H. Balakrishnan, and S. Madden. A measurement study of vehicular Internet access using in situ Wi-Fi networks. In *Proc. of MobiCom*, pages 50-61, 2006.

10 Cabspotting. http://www.cabspotting.com.

11 J. Camp and E. Knightly. Modulation rate adaptation in urban and vehicular environments: Cross-layer implementation and experimental evaluation. In *Proc. of MobiCom*, September 2008.

12 Car2Car communication consortium. http://www.car-to-car.org.

13 Cartel. http://cartel.csail.mit.edu/doku.php.

14 M. Chesire, A. Wolman, G. M. Voelker, and H. M. Levy. Measurement and analysis of a streaming-media workload. In *Proc. of USITS*, March 2001.

15 Emulab. http://www.emulab.net.

16 J. Eriksson, H. Balakrishnan, and S. Madden. Cabernet: Vehicular content delivery using WiFi. In *Proc. of MobiCom*, September 2008.

17 J. Ghosh, M. J. Beal, H. Q. Ngo, and C. Qiao. On profiling mobility and predicting locations of wireless users. In *Proc. of REALMAN*, pages 55-62, 2006.

18 M. Grossglauser and D. N.C. Tse. Mobility increases the capacity of ad hoc wireless networks. In *Proc. of INFOCOM*, April 2001.

19 D. Hadaller, S. Keshav, T. Brecht, and S. Agarwal. Vehicular opportunistic communication under the microscope. In *Proc. of MobiSys*, pages 206-219, 2007.

20 T. Ho, M. Medard, J. Shi, M. Eros, and D. R. Karger. On randomized network coding, Oct. 6, 2003. http://web.mit.edu/trace/www/allerton.pdf.

21 P. Juang, H. Oki, Y. Wang, M. Martonosi, L. S. Peh, and D. Rubenstein. Energy-efficient computing for wildlife tracking: Design tradeoffs and early experiences with ZebraNet. In *Proc. of ACM ASPLOS*, October 2002.

22 G. Liu and G. Maguire, Jr. A class of mobile motion prediction algorithms for wireless mobile computing and communication. *Mob. Netw. Appl.*, 1(2):113-121, 1996.

23 T. Liu, P. Bahl, S. Member, and I. Chlamtac. Mobility modeling, location tracking, and trajectory prediction in wireless ATM networks, Mar. 3, 1998.

24 L. McNamara, C. Mascolo, and L. Capra. Media sharing based on colocation prediction in urban transport. In *Proc. of MobiCom*, pages 58-69, 2008.

25 V. Navda, A. P. Subramanian, K. Dhanasekaran, A. Timm-Giel, and S. Das. Mobisteer: using steerable beam directional antenna for vehicular network access. In *Proc. of MobiSys*, pages 192-205, 2007.

26 A. J. Nicholson and B. D. Noble. Breadcrumbs: Forecasting mobile connectivity. In *Proc. of MobiCom*, September 2008.

27 L. M. S. C. of the IEEE Computer Society. Wireless LAN medium access control (MAC) and physical layer (PHY) specifications. *IEEE Standard* 802.11, 1999.

28 E. Oliver. A survey of platforms for mobile networks research. *SIGMOBILE Mob. Comput. Commun. Rev.*, 12(4):56-63, 2008.

29 S. Pack and Y. Choi. Fast inter-ap handoff using predictive authentication scheme in a public wireless LAN. In *Proc. of Networks Conference*, August 2002.

30 P. N. Pathirana, A. V. Savkin, and S. Jha. Mobility modeling and trajectory prediction for cellular networks with mobile base stations. In *MobiHoc*, pages 213-221. ACM, 2003.

31 Laptop & smartphone users prefer Wi-Fi to 3g; willing to pay for citywide Wi-Fi. http://www.teleclick.ca/2009/02/laptop-willing-to-pay-for-citywide-wi-fi/.

32 I. Ramani and S. Savage. Syncscan: Practical fast handoff for 802.11 infrastructure networks. In *Proc. of INFOCOM*, March 2005.

33 M. Shin, A. Mishra, and W. Arbaugh. Improving the latency of 802.11 hand-offs using neighbor graphs. In *Proc. of MobiSys*, June 2004.

34 L. Song, U. Deshpande, U. C. Kozat, D. Kotz, and R. Jain. Predictability of WLAN mobility and its effects on bandwidth provisioning. In *Proc. of INFOCOM*, 2006.

35 L. Song, D. Kotz, R. Jain, and X. He. Evaluating location predictors with extensive Wi-Fi mobility data. In *Proc. of INFOCOM*, March 2004.

36 Memory cards. http://en.wikipedia.org/wiki/Comparison_of_memory_cards.

37 Toyota and Honda vehicle-to-vehicle communication systems. http://www.motorauthority.com/toyota-and-honda-start-testing-vehicle-to-vehicle-communications-systems.html.

38 A. Vandat and D. Becker. Epidemic routing for partially connected ad hoc networks. Technical Report CS-200006, Duke University, 2000.

39 Wifi-taxi. http://www.wifi-taxi.com/cgv_en.htm.

40 Wikipedia. F1 score. http://en.wikipedia.org/wiki/F1_score.

41 Wikipedia. Matching. http://en.wikipedia.org/wiki/Matching.

42 Wikipedia. Smartphone. http://en.wikipedia.org/wiki/Smartphone.

43 Wikipedia. Vehicular ad-hoc network. http://en.wikipedia.org/wiki/VANET.

44 Yahoo! Local Search Web Services. http://developeryahoo.com/search/local/V3/localSearch.html.

45 V. N. Padmanabhan and J. C. Mogul. Using predictive prefetching to improve world wide web latency. SIGCOMM Computer Communication Review, 26(3):22-36, 1996.

46 Mobile Broadband Review 2010. http://mobile-broadband-services-review.toptenreviews.com/.

47 B. B. Chen and M. C. Chan. MobTorrent: a framework for mobile internet access from vehicles. In *Proc. of IEEE INFOCOM*, 2009.

48 P. Deshpande, A. Kashyap, C. Sung, and S. Das. Predictive methods for improved vehicular wifi access. In *Proc. of ACM MobiSys*, 2009.

49 Lp solve: Linear programming code. http://www.cs.sunysb.edu/~algorith/implement/lpsolve/implement.shtml.

50 Cplex. http://www.ilog.com/products/cplex/.

51 Seattle Bus Traces. http://crawdad.cs.dartmouth.edu/meta.php?name=rice/ad_hoc_city.

52 D. D. Couto, D. Aguayo, J. Bicket, and R. Morris. A high-throughput path metric for multi-hop wireless routing. In *Proc. of ACM MobiCom*, September 2003.

53 N. Banerjee, M. Corner, D. Towsley, and B. Levine. Relays, base stations, and meshes: Enhancing mobile networks with infrastructure. In *Proc. of MobiCom*, September 2008.

54 AWE Mesh Router. http://www.nomadio.net/AWE_overview.pdf.

55 Meraki MR58. http://meraki.com/products_services/access_points/MR58/.

56 S. Das, A. Nandan, and G. Pau. Spawn: a swarming protocol for vehicular ad-hoc wireless networks. In *Proc. of VANET*, 2004.

57 K. C. Lee, S.-H. Lee, R. Cheung, U. Lee, and M. Gerla. First Experience with CarTorrent in a Real Vehicular Ad Hoc Network Testbed. In *MOVE '07*, 2007.

58 AT&T DSL. http://www.att.com/gen/general?pid=6431.

59 R. Draves, J. Padhye, and B. Zill. Routing in multi-radio, multi-hop wireless mesh networks. In *Proc. of MobiCom*, September-October 2004.

60 B. Randunovi and J. Y. L. Boudec. Rate performance objectives of multihop wireless networks. In *Proc. of INFOCOM*, April 2004.

61 Worldwide pricelist for iPhone 3G Plans. http://www.un-wiredview.com/2008/07/16/worldwide-pricelist-for-iphone-3g%-plans/.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method of providing an electronic content to a vehicle from one or more access points within a network using a controller, the method comprising the steps of:

dividing the electronic content into one or more files wherein each file contains at least one packet using the controller;

generating two or more random linear combinations of the packets within each file using the controller;

for each file, replicating each random linear combination of the packets to a different access point within the network in accordance with a linear program; and providing the electronic content to the vehicle using at least one of the different access points by associating the vehicle with one of the different access points, providing a list of the files received and a list of the files requested from the vehicle to the associated access point, and downloading the files within the list of the files requested that are available at the associated access point to the vehicle until the download is complete or the vehicle is no longer associated.

2. The method as recited in claim 1, wherein:

the vehicle comprises a scooter, a motorcycle, a car, a truck, a boat, or a non-motorized vehicle; and at least one of the access points is communicably coupled to the Internet.

3. The method as recited in claim 1, wherein the electronic content is provided to an electronic device within the vehicle comprising a computer, a communications device, a smartphone, a personal data assistant, an entertainment device, an information center or a combination thereof.

4. The method as recited in claim 1, wherein the linear program comprises the following equations:

Input: Intv, WCap(a), InCap(a), OutCap(i), CT(a,v), AP(v), size(f), has(n,f), Q(v,f), γ

Output: x(f,i,a) and D(v,f,a)

Maximize: $\Sigma_v \Sigma_f \Sigma_{a \in AP(v)} Q(v,f) D(v,f,a) - \gamma \Sigma_{i \in I} \Sigma_{a \in A} \Sigma_f x(f,i,a)$ Subject to:

$\Sigma_f D(v,f,a) \leq WCap(a) \times CT(a,v) \forall v, a \in AP(v)$     [C1]

$\Sigma_{a \in AP(v)} D(v,f,a) \leq size(f) - has(v,f) \forall v,f$     [C2]

$D(v,f,a) \leq has(a,f) + \Sigma_{i \in I} x(f,i,a) \forall v,f, a \in AP(v)$     [C3]

$\Sigma_{i \in I} x(f,i,a) \leq size(f) - has(a,f) \forall f, a \in A$     [C4]

$\Sigma_{i \in I} \Sigma_f x(f,i,a) \leq InCap(a) \times Intv \forall a \in A$     [C5]

$\Sigma_{a \in A} \Sigma_f x(f,i,a) \leq OutCap(i) \times Intv \forall i \in I$     [C6]

where v is a vehicle, f is a file, a is an AP, i is a node with wireline connectivity (which may or may not be an AP, e.g., a Web server), Intv is an interval duration, A is the set of all the APs, I is the set of all the nodes with wireline connectivity, AP(v) is the set of APs that vehicle v will visit, , γ is a weighting factor, Q(v,f) is the probability that v is interested in file f, D(v,f,a) is the amount of traffic in file f vehicle v should download from AP a during a contact in the next interval, x(f, n1, n2) is the amount of traffic in file f to replicate from node n1 to node n2 during the current interval, CT(a,v) is average contact time of vehicle v at AP a, WCap(a) is wireless capacity at AP a, InCap(a) is incoming wireline access link capacity at AP a, OutCap(i) is outgoing wireline access link capacity at node i, has(n,f) is amount of file f a node n has (the node n can be either an AP a or vehicle v), and size(f) is the size of file f.

5. The method as recited in claim 1, wherein the different access points are determined based on a mobility prediction algorithm.

6. The method as recited in claim 1, further comprising the step of using the vehicle to transfer one or more files from a first access point to a second access point.

7. The method as recited in claim 6, wherein the linear program comprises the following equations:

Input: Intv, WCap(a), InCap(a), OutCap(i), CT(a,v), AP(v), size(f), has(n,f), Q(v,f), γ, y(f,$a_1$, $a_2$), $N_{path}$, RelayF
Output: x(f,i,a) and D(v,f,a)
Maximize: $\Sigma_v \Sigma_f \Sigma_{a \in AP(v)} Q(v,f) D(v,f,a) - \gamma \Sigma_{i \in I} \Sigma_{a \in A} \Sigma_f x(f,i,a)$
Subject to:

$\Sigma_f \max_{a2} y(f,a_1,a_2) + \Sigma_f \Sigma_{a2} y(f,a_2,a_1) \leq WCap(a1) \times CT(a1) \times RelayF \forall a_1$  [C0]

$\Sigma_f D(v,f,a) \leq WCap(a) \times CT(a,v) \times (1-RelayF) \forall v, a \in AP(v)$  [C1]

$\Sigma_{a \in AP(v)} D(v,f,a) \leq size(f) - has(v,f) \forall v,f$  [C2]

$D(v,f,a) \leq has(a,f) + \Sigma_{i \in I} x(f,i,a) + \Sigma_{a2 \neq a} y(f,a_2,a) \times N_{path} \forall v,f, a \in AP(v)$  [C3]

$\Sigma_{i \in I} x(f,i,a) \leq size(f) - has(a,f) \forall f, a \in A$  [C4]

$\Sigma_{i \in I} \Sigma_f x(f,i,a) \leq InCap(a) \times Intv \forall a \in A$  [C5]

$\Sigma_{a \in A} \Sigma_f x(f,i,a) \leq OutCap(i) \times Intv \forall i \in I$  [C6]

where v is a vehicle, f is a file, a is an AP, i is a node with wireline connectivity (which may or may not be an AP, e.g., a Web server), Intv is an interval duration, A is the set of all the APs, I is the set of all the nodes with wireline connectivity (including the web or content server), γ is a weighting factor, AP(v) is the set of APs that vehicle v will visit, Q(v, f) is the probability that v is interested in file f, D(v, f, a) is the amount of traffic in file f vehicle v should download from AP a during a contact in the next interval, x(f, n1, n2) is the amount of traffic in file f to replicate from node n1 to node n2 during the current interval CT(a, v) is average contact time of vehicle v at AP a, WCap(a) is wireless capacity at AP a, InCap(a) is incoming wireless access link capacity at AP a, OutCap (i) is outgoing wireline access link capacity at node i, has(n, f) is amount of file f a node n has, size(f) is the size of file f, y(f, $a_1$, $a_2$) denotes the amount of traffic to be relayed via wireless from AP $a_1$ to AP $a_2$ for a given file f in the current interval, RelayF is the fraction of capacity reserved for relaying, and $N_{path}$ is the number of paths.

8. The method as recited in claim 1, wherein the network comprises a mesh network.

9. The method as recited in claim 8, wherein the linear program comprises the following equations:

Input: Intv, WCap(a), InCap(a), OutCap(i), CT(a, v), AP(v), size(f), has(n,f), Q(v,f), γ,γ', MCap(a',a), z(f,a',a), ETX(a',a)
Output: x(f,i,a) and D(v,f,a)
Maximize: $\Sigma_v \Sigma_f \Sigma_{a \in AP(v)} Q(v,f) D(v,f,a) - \gamma \Sigma_{i \in I} \Sigma_{a \in A} \Sigma_f x(f,i,a) - \gamma' \Sigma_f \Sigma_{(a',a) \in mesh} z(f,a',a)$
Subject to:

$\Sigma_f D(v,f,a) \leq WCap(a) \times CT(a,v) \forall v, a \in AP(v)$  [C1]

$\Sigma_{a \in AP(v)} D(v,f,a) \leq size(f) - has(v,f) \forall v,f$  [C2]

$D(v,f,a) \leq has(a,f) + \Sigma_{i \in I} x(f,i,a) + \Sigma_{(a',a) \in mesh} z(f,a',a) \forall v,f, a \in AP(v)$  [C3]

$\Sigma_{i \in I} x(f,i,a) \leq size(f) - has(a,f) \forall f, a \in A$  [C4]

$\Sigma_{i \in I} \Sigma_f x(f,i,a) \leq InCap(a) \times Intv \forall a \in A$  [C5]

$\Sigma_{a \in A} \Sigma_f x(f,i,a) \leq OutCap(i) \times Intv \forall i \in I$  [C6]

$z(f,a',a) \leq has(a',f)$  [C7]

$\Sigma_{f,(a',a) \in mesh} ETX(a',a) z(f,a',a) MCap(a',a) \leq 1$  [C8]

where v is a vehicle, f is a file, a is an AP, i is a node with wireline connectivity (which may or may not be an AP, e.g., a Web server), Intv is an interval duration, A is the set of all the APs, I is the set of all the nodes with wireline connectivity, AP(v) is the set of APs that vehicle v will visit, Q(v,f) is the probability that v is interested in file f, D(v, f, a) is the amount of traffic in file f vehicle v should download from AP a during a contact in the next interval, x(f, n1, n2) is the amount of traffic in file f to replicate from node n1 to node n2 during the current interval, CT (a, v) is average contact time of vehicle v at AP a, WCap(a) is wireless capacity at AP a, InCap(a) is incoming wireline access link capacity at AP a, OutCap(i) is outgoing wireline access link capacity at node i, has(n,f) is amount of file f a node n has, size(f) is the size of file f, γ and γ' are weighting factors, MCap(a', a) denotes the capacity of a wireless link from AP a' to a in the mesh network, z(f, a', a) denotes the amount of content to replicate from AP a' to a for file f through the mesh network, and ETX(a', a) denotes the average number of transmissions required to send a packet from a' to a through the mesh.

10. The method as recited in claim 1, further comprising the step of uploading files from the vehicle to one of the access points as part of the replication process.

11. The method as recited in claim 10, further comprising the step of uploading one or more files between the vehicle and the associated access point while the vehicle is downloading the files within the list of the files.

12. The method as recited in claim 1, further comprising the step of replicating the files using inter-flow network coding.

13. A system comprising:
at least one vehicle;
one or more access points within a network;
a controller communicably coupled to the one or more access points, wherein the controller is configured to: (i) divide the electronic content into one or more files wherein each file contains at least one packet, (ii) generate two or more random linear combinations of the packets within each file, and (iii) for each file, replicate each random linear combination of the packets to a different access point within the network in accordance with a linear program; and
wherein at least one of the different access points provide the electronic content to the vehicle by associating the vehicle with one of the different access points, providing a list of the files received and a list of the files requested from the vehicle to the associated access point, and downloading the files within the list of the files requested that are available at the associated access point to the vehicle until the download is complete or the vehicle is no longer associated.

14. The system as recited in claim 13, wherein the vehicle comprises a scooter, a motorcycle, a car, a truck, a boat, or a non-motorized vehicle.

15. The system as recited in claim 13, wherein:
the electronic content is provided to an electronic device within the vehicle comprising a computer, a communications device, a smartphone, a personal data assistant, an entertainment device, an information center or a combination thereof; and
at least one of the access points is communicably coupled to the Internet.

16. The system as recited in claim 13, wherein the linear program comprises following equations:
Input: Intv, WCap(a), InCap(a), OutCap(i), CT(a,v), AP(v), size(f), has(n,f), Q(v,f), γ
Output: x(f,i,a) and D(v,f,a)
Maximize: $\Sigma_v \Sigma_f \Sigma_{a \in AP(v)} Q(v,f) D(v,f,a) - \gamma \Sigma_{i \in I} \Sigma_{a \in A} \Sigma_f x(f,i,a)$
Subject to:

$\Sigma_f D(v,f,a) \leq WCap(a) \times CT(a,v) \forall v, a \in AP(v)$ [C1]

$\Sigma_{a \in AP(v)} D(v,f,a) \leq size(f) - has(v,f) \forall v,f$ [C2]

$D(v,f,a) \leq has(a,f) + \Sigma_{i \in I} x(f,i,a) \forall v,f, a \in AP(v)$ [C3]

$\Sigma_{i \in I} x(f,i,a) \leq size(f) - has(a,f) \forall f, a \in A$ [C4]

$\Sigma_{i \in I} \Sigma_f x(f,i,a) \leq InCap(a) \times Intv \forall a \in A$ [C5]

$\Sigma_{a \in A} \Sigma_f x(f,i,a) \leq OutCap(i) \times Intv \forall i \in I$ [C6]

where v is a vehicle, f is a file, a is an AP, i is a node with wireline connectivity (which may or may not be an AP, e.g., a Web server), Intv is an interval duration, A is the set of all the APs, I is the set of all the nodes with wireline connectivity, AP(v) is the set of APs that vehicle v will visit, γ is a weighting factor, Q(v, f) is the probability that v is interested in file f, D(v, f, a) is the amount of traffic in file f vehicle v should download from AP a during a contact in the next interval, x(f, n1, n2) is the amount of traffic in file f to replicate from node n1 to node n2 during the current interval, CT(a, v) is average contact time of vehicle v at AP a, WCap(a) is wireless capacity at AP a, InCap(a) is incoming wireline access link capacity at AP a, OutCap(i) is outgoing wireline access link capacity at node i, has(n,f) is amount of file f a node n has (the node n can be either an AP a or vehicle v), and size(f) is the size of file f.

17. The system as recited in claim 13, wherein the different access points are determined based on a mobility prediction algorithm.

18. The system as recited in claim 13, wherein the vehicle transfers one or more files from a first access point to a second access point.

19. The system as recited in claim 18, wherein the linear program comprises the following equations:
Input: Intv, WCap(a), InCap(a), OutCap(i), CT(a,v), AP(v), size(f), has(n,f), Q(v,f), γ, y(f,$a_1$,$a_2$), $N_{path}$, RelayF
Output: x(f,i,a) and D(v,f,a)
Maximize: $\Sigma_v \Sigma_f \Sigma_{a \in AP(v)} Q(v,f) D(v,f,a) - \gamma \Sigma_{i \in I} \Sigma_{a \in A} \Sigma_f x(f,i,a)$
Subject to:

$\Sigma_f \max_{a2} y(f,a_1,a_2) + \Sigma_f \Sigma_{a2} y(f,a_2, a_1) \leq WCap(a1) \times CT(a1) \times RelayF \forall a_1$ [C0]

$\Sigma_f D(v,f,a) \leq WCap(a) \times CT(a,v) \times (1 - RelayF) \forall v, a \in AP(v)$ [C1]

$\Sigma_{a \in AP(v)} D(v,f,a) \leq size(f) - has(v,f) \forall v,f$ [C2]

$D(v,f,a) \leq has(a,f) + \Sigma_{i \in I} x(f,i,a) + \Sigma_{a2 \neq a} y(f,a_2,a) \times N_{path} \forall v,f, a \in AP(v)$ [C3]

$\Sigma_{i \in I} x(f,i,a) \leq size(f) - has(a,f) \forall f, a \in A$ [C4]

$\Sigma_{i \in I} \Sigma_f x(f,i,a) \leq InCap(a) \times Intv \forall a \in A$ [C5]

$\Sigma_{a \in A} \Sigma_f x(f,i,a) \leq OutCap(i) \times Intv \forall a \in I$ [C6]

where v is a vehicle, f is a file, a is an AP, i is a node with wireline connectivity (which may or may not be an AP, e.g., a Web server), Intv is an interval duration, A is the set of all the APs, I is the set of all the nodes with wireline connectivity (including the web or content server), γ is a weighting factor, AP(v) is the set of APs that vehicle v will visit, Q(v,f) is the probability that v is interested in file f, D(v, f, a) is the amount of traffic in file f vehicle v should download from AP a during a contact in the next interval, x(f, nl, n2) is the amount of traffic in file f to replicate from node n1 to node n2 during the current interval, CT(a, v) is average contact time of vehicle v at AP a, WCap(a) is wireless capacity at AP a, InCap(a) is incoming wireline access link capacity at AP a, OutCap(i) is outgoing wireline access link capacity at node i, has(n,f) is amount of file f a node n has, size(f) is the size of file f, y(f, $a_1$, $a_2$) denotes the amount of traffic to be relayed via wireless from AP $a_1$ to AP $a_2$ for a given file f in the current interval, RelayF is the fraction of capacity reserved for relaying, and $N_{path}$ is the number of paths.

20. The system as recited in claim 13, wherein the network comprises a mesh network.

21. The system as recited in claim 20, wherein the linear program comprises the following equations:
Input: Intv, WCap(a), InCap(a), OutCap(i), CT(a,v), AP(v), size(f), has(n,f), Q(v,f), γ, γ', MCap(a', a), z(f,a', a), ETX(a', a)
Output: x(f,i,a) and D(v,f,a)
Maximize: $\Sigma_v \Sigma_f \Sigma_{a \in AP(v)} Q(v,f) D(v,f,a) - \gamma \Sigma_{i \in I} \Sigma_{a \in A} \Sigma_f x(f,i,a) - \gamma' \Sigma_f \Sigma_{(a',a) \in mesh} z(f,a',a)$
Subject to:

$\Sigma_f D(v,f,a) \leq WCap(a) \times CT(a,v) \forall v, a \in AP(v)$ [C1]

$\Sigma_{a \in AP(v)} D(v,f,a) \leq size(f) - has(v,f) \forall v,f$ [C2]

$D(v,f,a) \leq has(a,f) + \Sigma_{i \in I} x(f,i,a) + \Sigma_{(a',a) \in mesh} z(f, a',a) \forall v,f, a \in AP(v)$ [C3]

$\Sigma_{i \in I} x(f,i,a) \leq size(f) - has(a,f) \forall f, a \in A$ [C4]

$\Sigma_{i \in I} \Sigma_f x(f,i,a) \leq InCap(a) \times Intv \forall a \in A$ [C5]

$\Sigma_{a \in A} \Sigma_f x(f,i,a) \leq OutCap(i) \times Intv \forall i \in I$ [C6]

$z(f,a',a) \leq has(a',f)$ [C7]

$\Sigma_{f,(a',a) \in mesh} ETX(a',a) z(f,a',a) MCap(a',a) \leq 1$ [C8]

where v is a vehicle, f is a file, a is an AP, i is a node with wireline connectivity (which may or may not be an AP, e.g., a Web server), Intv is an interval duration, A is the set of all the APs, I is the set of all the nodes with wireline connectivity, AP(v) is the set of APs that vehicle v will visit, Q(v, f) is the probability that v is interested in file f, D(v, f, a) is the amount of traffic in file f vehicle v should download from AP a during a contact in the next interval, x(f, n1, n2) is the amount of traffic in file f to replicate from node n1 to node n2 during the current interval, CT (a, v) is average contact time of vehicle v at AP a, WCap(a) is wireless capacity at AP a, InCap(a) is incoming wireline access link capacity at AP a, OutCap (i) is outgoing wireline access link capacity at node i, has(n, f) is amount of file f a node n has, size(f) is the size of file f, $\gamma$ and $\gamma'$ are weighting factors, MCap(a', a) denotes the capacity of a wireless link from AP a' to a in the mesh network, z(f, a', a) denotes the amount of content to replicate from AP a' to a for file f through the mesh network, and ETX(a', a) denotes the average number of transmissions required to send a packet from a' to a through the mesh.

22. The system as recited in claim 13, wherein files are uploaded from the vehicle to one of the access points as part of the replication process.

23. The system as recited in claim 22, further comprising the step of uploading one or more files between the vehicle and the associated access point while the vehicle is downloading the files within the list of the files.

24. The system as recited in claim 13, wherein the files are further replicated using inter-flow network coding.

25. The method as recited in claim 11, further comprising the step of ordering the files to upload based on a future demand for the files at the associated access point wherein the future demand is estimated using the formula $\Sigma\{v: v \text{ visits } AP\} Q(v,f) \text{demand}(v,f)$, where $Q(v,f)$ is the probability that v is interested in file f and demand(v,f) is the expected size of file f vehicle v is interested in.

26. The method as recited in claim 23, further comprising the step of ordering the files to upload based on a future demand for the files at the associated access point wherein the future demand is estimated using the formula $\Sigma\{v: v \text{ visits } AP\} Q(v,f) \text{demand}(v,f)$, where $Q(v,f)$ is the probability that v is interested in file f and demand(v,f) is the expected size of file f vehicle v is interested in.

* * * * *